(12) United States Patent
Blehm et al.

(10) Patent No.: US 12,332,153 B2
(45) Date of Patent: *Jun. 17, 2025

(54) EOSIN STAINING TECHNIQUES

(71) Applicant: Ventana Medical Systems, Inc., Tucson, AZ (US)

(72) Inventors: Benjamin H. Blehm, Tucson, AZ (US); Evan T. Graves, Tucson, AZ (US); Edward E. Durrant, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,749

(22) Filed: Feb. 21, 2024

(65) Prior Publication Data

US 2024/0272043 A1    Aug. 15, 2024

Related U.S. Application Data

(63) Continuation of application No. 16/891,896, filed on Jun. 3, 2020, now Pat. No. 11,940,358, which is a continuation of application No. PCT/EP2018/086062, filed on Dec. 20, 2018.

(60) Provisional application No. 62/610,211, filed on Dec. 24, 2017.

(51) Int. Cl.
*G01N 1/30* (2006.01)
(52) U.S. Cl.
CPC ......... *G01N 1/30* (2013.01); *G01N 2001/302* (2013.01)
(58) Field of Classification Search
None
See application file for complete search history.

(56) References Cited

U.S. PATENT DOCUMENTS

| 5,318,795 | A | 6/1994 | Stokes et al. |
| 7,226,788 | B2 | 6/2007 | De La Torre-Bueno |
| 9,915,592 | B2 | 3/2018 | Sood et al. |
| 10,234,365 | B2 | 3/2019 | Hansen et al. |
| 2004/0009098 | A1 | 1/2004 | Torre-Bueno |
| 2012/0322099 | A1 | 12/2012 | Lapen et al. |
| 2013/0095473 | A1 | 4/2013 | Groelz |
| 2013/0203109 | A1 | 8/2013 | Hansen et al. |
| 2013/0302852 | A1 | 11/2013 | Barnes et al. |
| 2014/0242634 | A1* | 8/2014 | Hansen ............... G01N 1/30  435/40.52 |

(Continued)

FOREIGN PATENT DOCUMENTS

| EP | 3012632 A1 | 4/2016 |
| GB | 673441 A | 6/1952 |
| JP | 2017129447 A | 7/2017 |

(Continued)

OTHER PUBLICATIONS

International Search Report and Written Opinion, dated Jul. 26, 2019.

*Primary Examiner* — Christopher Braniff
(74) *Attorney, Agent, or Firm* — Charney IP Law LLC; Thomas M. Finetti

(57) ABSTRACT

Presented herein are methods of improving the consistency of staining with a counterstain. In some embodiments, the method makes use of an automated specimen processing apparatus or other staining device. In some embodiments, the staining methods are applied manually. In some embodiments, the counterstain includes eosin.

20 Claims, 19 Drawing Sheets

(56) References Cited

U.S. PATENT DOCUMENTS

2016/0178621 A1    6/2016   Gouda et al.
2016/0282374 A1    9/2016   Barnett et al.

FOREIGN PATENT DOCUMENTS

| WO | 1992019952 A1 | 11/1992 |
| WO | 2003106157 A2 | 12/2003 |
| WO | 2011157678 A1 | 12/2011 |
| WO | 2012096842 A1 | 7/2012 |
| WO | 2013112891 A1 | 8/2013 |
| WO | 2014138197 A1 | 9/2014 |

\* cited by examiner

HABEA3W2TL Shrt

HABE3A2TL Shrt

HABEA3W2TL Med

HABE3A2TL Med

HABEA3W2TL Long

HABE3A2TL Long

Nominal

Nominal 2

EOSIN STAINING TECHNIQUES

CROSS-REFERENCE TO RELATED APPLICATIONS

The present application is a continuation of U.S. patent application Ser. No. 16/891,896 filed on Jun. 3, 2020, which application is a continuation of International Application No. PCT/EP2018/086062 filed on Dec. 20, 2018, which application claims the benefit of the filing date of U.S. Provisional Patent Application No. 62/610,211 filed on Dec. 24, 2017, the disclosures of which are hereby incorporated by reference herein in their entireties.

BACKGROUND OF THE DISCLOSURE

Many tissues do not retain enough color after processing to make their components visible under a bright-field microscope. Accordingly, it is a common practice to add color or dyes to tissues by staining them. The hematoxylin and eosin ("H&E") stain is probably the most widely used histological stain. Its popularity is based on its comparative simplicity and ability to demonstrate clearly an enormous number of different tissue structures. Hematoxylin can be prepared in numerous ways and has a widespread applicability to tissues from different sites. Essentially, the hematoxylin component stains the cell nuclei blue/black, with good intranuclear detail, while the eosin stains cell cytoplasm and most connective tissue fibers in varying shades and intensities of pink, orange and red.

Accurate diagnosis depends on a pathologist or cytologist examining stained microscope slides, usually H&E paraffin sections, the H&E staining having been carried out in bulk by an automated staining machine. The need for consistency is vital to avoid difficult histological interpretation. In general, automated staining machines allow accurate and consistent staining, differentiation and dehydration by adjusting the times of each step.

Certain standard procedures usually apply to the staining of tissues on the slides. Paraffin sections first must be de-paraffinized, because most stains are applied in either aqueous or alcoholic solutions and will not penetrate paraffin-infiltrated tissues. After the slides are de-paraffinized, the slides typically are baked in an oven or other heated chamber to drive off de-paraffinizing solvent, and adhere the tissues to the slides. The tissues may then be stained using, for example, standard stains such as hematoxylin and eosin. Finally, coverslipping is performed by adhering a thin glass coverslip to the stained tissue section, and then sealing it with a mounting agent, thereby creating a hermetically sealed environment suitable for archiving.

BRIEF SUMMARY OF THE DISCLOSURE

Applicants have developed systems and methods to improve the consistency of staining with a counterstain using an automated specimen processing apparatus. Applicants believe that the systems and methods described herein allow for improved counterstaining on the edges of tissue and/or within fatty portions of the tissue. Indeed, Applicants have surprisingly discovered that moving and/or altering certain automated fluid dispensing steps allows for improved consistency of the stain within the tissue, improved counterstain intensity, and reproducibility of staining consistency and/or intensity from sample to sample. The improved counterstaining techniques allow for a reduction in the inconsistencies sometimes found with the automated application of eosin stains.

In view of the foregoing, in one aspect of the present disclosure is a method of staining a specimen disposed on a substrate with an automated specimen processing apparatus wherein the automated staining apparatus is configured to stain a specimen with a primary stain and a counterstain, and wherein the automated staining apparatus is configured to either: (i) apply an acid solution to the specimen immediately following staining with the counterstain, and where no acid solution is applied to the specimen between staining with the primary stain and the counterstain; (ii) apply an acid solution to the specimen between primary staining and counterstaining, and also apply an acid solution to the specimen immediately after counterstaining; or (iii) apply two or less aliquots of wash solution immediately following counterstaining but prior to the application of an organic fluid solution or the addition of a coverslip, and also apply at least two aliquots of transfer solution between counterstaining and the application or an organic fluid solution or a coverslip. In some embodiments, the transfer solution is any solution which has a neutral effect on staining or counterstaining. In these non-limiting embodiments where transfer solution is used for its entirely neutral effect on the stain, it is being entirely used to at least partially remove remaining stain solution from the slide, not to differentiate the stain, or not to differentiate the stain to any discernable degree. In these situations, the stain has been rendered entirely progressive due to the minimal differentiation caused by the transfer solution.

In another aspect of the present disclosure is a method for processing a specimen within an automated staining system, the method comprising: contacting the specimen with a staining reagent; contacting the specimen with a wash solution to at least partially remove the staining reagent from the specimen; contacting the specimen with a counterstaining reagent after contacting the specimen with the wash solution; and contacting the specimen with an acid solution; wherein the specimen is not contacted with an acid solution prior to the contacting of the specimen with the counterstain. In some embodiments, the method further comprises contacting the specimen with an alkaline solution after contacting the specimen with the staining reagent, but before contacting the specimen with the counterstaining reagent.

In another aspect of the present disclosure is a method for processing a specimen within an automated staining system, the method comprising: contacting the specimen with a staining reagent; contacting the specimen with a wash solution to at least partially remove the staining reagent from the specimen; contacting the specimen with a counterstaining reagent after contacting the specimen with the wash solution; and iteratively contacting the specimen with transfer solution; wherein the specimen is not contacted with the wash solution following the contacting of the specimen with the counterstain. In some embodiments, the method further comprises contacting the specimen with an alkaline solution after contacting the specimen with the staining reagent, but before contacting the specimen with the counterstaining reagent.

In another aspect of the present disclosure is a method of staining a specimen disposed on a substrate with an automated specimen processing apparatus comprising: (a) dispensing a predetermined amount of a hematoxylin solution to the specimen; (b) at least partially removing the hematoxylin solution from the specimen; (c) dispensing a predetermined amount of an alkaline solution to the specimen; (d)

at least partially removing the alkaline solution from the specimen; (e) dispensing a predetermined amount of at least one additional solution to the specimen; (f) at least partially removing the at least one additional solution from the specimen; (f) dispensing a predetermined amount of a counterstaining solution to the specimen; (g) at least partially removing the counterstaining solution from the specimen; and (h) dispensing a predetermined amount of an acid solution to the specimen. In some embodiments, the counterstaining solution includes eosin.

In another aspect of the present disclosure is a method of staining a specimen with an automated specimen processing apparatus comprising: (a) dispensing a predetermined amount of a hematoxylin solution to the specimen; (b) at least partially removing the hematoxylin solution from the specimen; (c) dispensing a predetermined amount of an alkaline solution to the specimen; (d) at least partially removing the alkaline solution from the specimen; (e) dispensing a predetermined amount of at least one additional solution to the specimen; (f) at least partially removing the at least one additional solution from the specimen; (f) dispensing a predetermined amount of an eosin staining solution to the specimen; (g) at least partially removing the eosin solution from the specimen; and (h) dispensing a predetermined amount of an acid solution to the specimen. In some embodiments, no acid solution is dispensed prior to eosin staining. In some embodiments, the method further comprises dispensing an acid solution to the specimen after hematoxylin staining but prior to eosin staining.

In some embodiments, the at least one additional solution is selected from the group consisting of a wash solution, a transfer solution, or an acid solution. In some embodiments, the at least one additional solution is a wash solution. In some embodiments, the dispensing of the at least one additional solution to the specimen comprises (i) dispensing a wash solution; (ii) at least partially removing the wash solution; (iii) dispensing an acid solution; and (iv) at least partially removing the acid solution. In some embodiments, the method further comprises dispensing a wash solution after the at least partial removal of the hematoxylin solution from the specimen and prior to the dispensing of the alkaline solution.

In some embodiments, the method further comprises (i) dispensing an acid solution after the at least partial removal of the hematoxylin solution from the specimen and prior to the dispensing of the alkaline solution; (ii) at least partially removing the acid solution from the specimen; and (iii) dispensing a wash solution to the specimen prior to dispensing the alkaline solution.

In another aspect of the present disclosure is a biological specimen stained with an automated specimen processing system, wherein the sample is stained by: (a) dispensing a predetermined amount of a hematoxylin solution to the biological specimen; (b) at least partially removing the hematoxylin solution from the specimen; (c) dispensing a predetermined amount of an alkaline solution to the specimen; (d) at least partially removing the alkaline solution from the specimen; (e) dispensing a predetermined amount of at least one additional solution to the specimen; (f) at least partially removing the at least one additional solution from the specimen; (f) dispensing a predetermined amount of an eosin staining solution to the specimen; (g) at least partially removing the eosin solution from the specimen; and (h) dispensing a predetermined amount of an acid solution to the specimen.

In another aspect of the present disclosure is a method of staining a specimen with an automated specimen processing apparatus consisting essentially of: dispensing a predetermined amount of a wash solution to the specimen; at least partially removing the wash solution from the specimen; dispensing a predetermined amount of an eosin staining solution to the specimen; at least partially removing the eosin solution from the specimen; dispensing a predetermined amount of an acid solution to the specimen; at least partially removing the acid solution; and dispensing a wash solution to the specimen.

In another aspect of the present disclosure is a method of staining a specimen with an automated specimen processing apparatus consisting of: dispensing a predetermined amount of a wash solution to the specimen; at least partially removing the wash solution from the specimen; dispensing a predetermined amount of an eosin staining solution to the specimen; at least partially removing the eosin solution from the specimen; dispensing a predetermined amount of an acid solution to the specimen; at least partially removing the acid solution; and dispensing a wash solution to the specimen.

In another aspect of the present disclosure is a method of staining a specimen with an automated specimen processing apparatus comprising of: dispensing a predetermined amount of an eosin staining solution to the specimen; at least partially removing the eosin solution from the specimen; and sequentially dispensing to the specimen and removing from the specimen four additional solutions, wherein the four additional solutions are selected from the group consisting of wash solutions and transfer solutions, and wherein at least two of the four additional solutions are transfer solutions.

In some embodiments, at least three of the four additional solutions are transfer solutions. In some embodiments, all four of the four additional solutions are transfer solutions. In some embodiments, the specimen is a specimen stained with hematoxylin. In some embodiments, the method further comprises dispensing an organic fluid solution to the specimen after the last of the at least four additional solutions has been removed.

In another aspect of the present disclosure is an automated histological staining system, comprising: a stainer; a slide carrier within the stainer, wherein the slide carrier carries slides having biological specimens disposed thereon; and a dispenser within the stainer configured to deliver a plurality of fluids to the slide; wherein the system is configured such that the biological specimens may be stained with a primary stain and a counterstain; and wherein the system is configured to dispense only wash solutions, transfer solutions, and/or alkaline solutions between staining with the primary stain and staining with the counterstain. In some embodiments, the system is configured to deliver an acid solution after staining with the counterstain. In some embodiments, the system is configured to dispense only acid solutions, transfer solutions, and organic fluid solutions following staining with the counterstain. In some embodiments, the system sequentially dispenses to the specimen and removes from the specimen four aliquots of transfer solution following staining with the counterstain. In some embodiments, the automated histological staining system comprises a device for removing fluids from the slide. In some embodiments, the system includes a slide tray holding a plurality of slides in a substantially horizontal position. In some embodiments, the disclosed system includes a slide tray holding a plurality of slides in a substantially horizontal position and a workstation that receives the slide tray. In some embodiments, a workstation delivers a reagent to slide surfaces without substantial transfer of reagent (and reagent borne contaminants such as dislodged cells) from one slide to another. In some embodiments, slides are held in a rectangular slide tray in two rows such that their long dimensions are disposed outward from the central, long axis of the tray toward the long edges of the tray. In some embodiments, a dispenser in a workstation is positioned above one or more pairs of slides in the opposite rows, and delivers a fluid, reagent, solution, etc. to one or more slides in one or the other of the two rows, for example, to a pair of slides that are opposite from each other in the two rows. In some embodiments, if the dispenser is positioned above fewer than the total number of slides that are held in the tray, the dispenser can move to dispense a fluid, reagent, solution, etc. to other slides in each row of slides, and/or the slide tray can be moved to bring additional slides into position for dispensing. In some embodiments, two or more stationary or moving reagent dispensers can be included in the workstation, or one or more manifolds of dispense nozzles can be positioned above the two rows of slides, for example, along the central, long axis of the tray. In some embodiments, nozzles of a dispenser can direct reagent downward and/or upward toward surfaces of slides.

In another aspect of the present disclosure is a system comprising: one or more processors; and a non-transitory computer-readable memory storing instructions which, when executed by the one or more processors, cause the one or more processors to: (a) dispense a predetermined amount of a hematoxylin solution to the specimen; (b) at least partially remove the hematoxylin solution from the specimen; (c) dispense a predetermined amount of an alkaline solution to the specimen; (d) at least partially remove the alkaline solution from the specimen; (e) dispense a predetermined amount of at least one additional solution to the specimen; (f) at least partially remove the at least one additional solution from the specimen; (g) dispense a predetermined amount of an eosin staining solution to the specimen; (h) at least partially remove the eosin solution from the specimen; and (i) dispense a predetermined amount of an acid solution to the specimen. In some embodiments, the system comprises instructions not to dispense any acid solution prior to eosin staining. In some embodiments, the system further comprises instructions to dispense an acid solution to the specimen after hematoxylin staining but prior to eosin staining. In some embodiments, the system includes a slide tray holding a plurality of slides in a substantially horizontal position and may further include a workstation that receives the slide tray. In some embodiments, the system includes a controller. In some embodiments, the controller includes a processor and a memory; and further comprises instructions for dispensing and/or removing solutions.

In another aspect of the present disclosure is a system comprising: one or more processors; and a non-transitory computer-readable memory storing instructions which, when executed by the one or more processors, cause an automated histological staining system to: (a) dispense a predetermined amount of a hematoxylin solution to a specimen; (b) at least partially remove the hematoxylin solution from the specimen; (c) dispense a predetermined amount of an alkaline solution to the specimen; (d) at least partially remove the alkaline solution from the specimen; (e) dispense a predetermined amount of at least one additional solution to the specimen; (f) at least partially remove the at least one additional solution from the specimen; (g) dispense a predetermined amount of an eosin staining solution to the specimen; (h) at least partially remove the eosin solution from the specimen; and (i) dispense a predetermined amount of an acid solution to the specimen. In some embodiments, the system comprises instructions not to dispense any acid solution prior to eosin staining. In some embodiments, the system further comprises instructions to dispense an acid solution to the specimen after hematoxylin staining but prior to eosin staining. In some embodiments, the system includes a slide tray holding a plurality of slides in a substantially horizontal position and may further include a workstation that receives the slide tray. In some embodiments, the system includes a controller. In some embodiments, the controller includes a processor and a memory; and further comprises instructions for dispensing and/or removing solutions.

In another aspect of the present disclosure is a system comprising: one or more processors; and a non-transitory computer-readable memory storing instructions which, when executed by the one or more processors, cause the one or more processors to: (a) dispense a predetermined amount of an eosin staining solution to the specimen; (b) at least partially remove the eosin solution from the specimen; and (c) sequentially dispense to the specimen and remove from the specimen four additional solutions, wherein the four additional solutions sequentially dispensed and removed are selected from the group consisting of wash solutions and transfer solutions, and wherein at least two of the four additional solutions are transfer solutions. In some embodiments, at least three of the four additional solutions are transfer solutions. In some embodiments, all four of the four additional solutions are transfer solutions. In some embodiments, the specimen comprises hematoxylin stain. In some embodiments, the system includes a slide tray holding a plurality of slides in a substantially horizontal position and a workstation that receives the slide tray. In some embodiments, the system includes a controller. In some embodiments, the controller includes a processor and a memory; and further comprises instructions for dispensing and/or removing solutions.

In another aspect of the present disclosure is a system comprising: one or more processors; and a non-transitory computer-readable memory storing instructions which, when executed by the one or more processors, cause an automated histological staining system to: (a) dispense a predetermined amount of an eosin staining solution to a specimen; (b) at least partially remove the eosin solution from the specimen; and (c) sequentially dispense to the specimen and remove from the specimen four additional solutions, wherein the four additional solutions sequentially dispensed and removed are selected from the group consisting of wash solutions and transfer solutions, and wherein at least two of the four additional solutions are transfer solutions. In some embodiments, at least three of the four additional solutions are transfer solutions. In some embodiments, all four of the four additional solutions are transfer solutions. In some embodiments, the specimen comprises hematoxylin stain. In some embodiments, the system includes a slide tray holding a plurality of slides in a substantially horizontal position and a workstation that receives the slide tray. In some embodiments, the system includes a controller. In some embodiments, the controller includes a processor and a memory; and further comprises instructions for dispensing and/or removing solutions.

In another aspect of the present disclosure is a system comprising: one or more processors; and a non-transitory computer-readable memory storing instructions which, when executed by the one or more processors, cause the one or more processors to: (a) introduce a predetermined amount of a hematoxylin solution to the specimen; (b) at least partially remove the hematoxylin solution from the specimen; (c) introduce a predetermined amount of an alkaline solution to the specimen; (d) at least partially remove the alkaline solution from the specimen; (e) introduce a predetermined amount of at least one additional solution to the specimen; (f) at least partially remove the at least one additional solution from the specimen; (g) introduce a predetermined amount of an eosin staining solution to the specimen; (h) at least partially remove the eosin solution from the specimen; and (i) introduce a predetermined amount of an acid solution to the specimen. In some embodiments, the system comprises instructions not to introduce any acid solution prior to eosin staining. In some embodiments, the system further comprises instructions to introduce an acid solution to the specimen after hematoxylin staining but prior to eosin staining. In some embodiments, the system includes a slide tray holding a plurality of slides in a substantially horizontal position and a workstation that receives the slide tray.

In another aspect of the present disclosure is a system comprising: one or more processors; and a non-transitory computer-readable memory storing instructions which, when executed by the one or more processors, cause an automated histological staining system to: (a) introduce a predetermined amount of a hematoxylin solution to a specimen; (b) at least partially remove the hematoxylin solution from the specimen; (c) introduce a predetermined amount of an alkaline solution to the specimen; (d) at least partially remove the alkaline solution from the specimen; (e) introduce a predetermined amount of at least one additional solution to the specimen; (f) at least partially remove the at least one additional solution from the specimen; (g) introduce a predetermined amount of an eosin staining solution to the specimen; (h) at least partially remove the eosin solution from the specimen; and (i) introduce a predetermined amount of an acid solution to the specimen. In some embodiments, the system comprises instructions not to introduce any acid solution prior to eosin staining. In some embodiments, the system further comprises instructions to introduce an acid solution to the specimen after hematoxylin staining but prior to eosin staining. In some embodiments, the system includes a slide tray holding a plurality of slides in a substantially horizontal position and a workstation that receives the slide tray.

In another aspect of the present disclosure is a system comprising: one or more processors; and a non-transitory computer-readable memory storing instructions which, when executed by the one or more processors, cause the one or more processors to: (a) introduce a predetermined amount of an eosin staining solution to the specimen; (b) at least partially remove the eosin solution from the specimen; and (c) sequentially introduce to the specimen and remove from the specimen four additional solutions, wherein the four additional solutions sequentially introduced and removed are selected from the group consisting of wash solutions and transfer solutions, and wherein at least two of the four additional solutions are transfer solutions. In some embodiments, at least three of the four additional solutions are transfer solutions. In some embodiments, all four of the four additional solutions are transfer solutions. In some embodiments, the specimen comprises hematoxylin stain. In some embodiments, the system includes a slide tray holding a plurality of slides in a substantially horizontal position and a workstation that receives the slide tray.

In another aspect of the present disclosure is a system comprising: one or more processors; and a non-transitory computer-readable memory storing instructions which, when executed by the one or more processors, cause an automated histological staining system to: (a) introduce a predetermined amount of an eosin staining solution to a specimen; (b) at least partially remove the eosin solution from the specimen; and (c) sequentially introduce to the specimen and remove from the specimen four additional solutions, wherein the four additional solutions sequentially introduced and removed are selected from the group consisting of wash solutions and transfer solutions, and wherein at least two of the four additional solutions are transfer solutions. In some embodiments, at least three of the four additional solutions are transfer solutions. In some embodiments, all four of the four additional solutions are transfer solutions. In some embodiments, the specimen comprises hematoxylin stain. In some embodiments, the system includes a slide tray holding a plurality of slides in a substantially horizontal position and a workstation that receives the slide tray.

In another aspect of the present disclosure is a non-transitory computer-readable storage medium encoded with instructions executable by a processing resource of a computing system to cause the computing system to: (a) dispense a predetermined amount of a hematoxylin solution to the specimen; (b) at least partially remove the hematoxylin solution from the specimen; (c) dispense a predetermined amount of an alkaline solution to the specimen; (d) at least partially remove the alkaline solution from the specimen; (e) dispense a predetermined amount of at least one additional solution to the specimen; (f) at least partially remove the at least one additional solution from the specimen; (g) dispense a predetermined amount of an eosin staining solution to the specimen; (h) at least partially remove the eosin solution from the specimen; and (i) dispense a predetermined amount of an acid solution to the specimen.

In another aspect of the present disclosure is a non-transitory computer-readable storage medium encoded with instructions, which when executed by a processing resource of a computing system, cause an automated histological staining system to: (a) dispense a predetermined amount of a hematoxylin solution to a specimen; (b) at least partially remove the hematoxylin solution from the specimen; (c) dispense a predetermined amount of an alkaline solution to the specimen; (d) at least partially remove the alkaline solution from the specimen; (e) dispense a predetermined amount of at least one additional solution to the specimen; (f) at least partially remove the at least one additional solution from the specimen; (g) dispense a predetermined amount of an eosin staining solution to the specimen; (h) at least partially remove the eosin solution from the specimen; and (i) dispense a predetermined amount of an acid solution to the specimen.

In another aspect of the present disclosure is a non-transitory computer-readable storage medium encoded with instructions executable by a processing resource of a computing system to cause the computing system to: (a) dispense a predetermined amount of an eosin staining solution to the specimen; (b) at least partially remove the eosin solution from the specimen; and (c) sequentially dispense to the specimen and remove from the specimen four additional solutions, wherein the four additional solutions sequentially dispensed and removed are selected from the group consisting of wash solutions and transfer solutions, and wherein at least two of the four additional solutions are transfer solutions.

In another aspect of the present disclosure is a non-transitory computer-readable storage medium encoded with instructions, which when executed by a processing resource of a computing system, cause an automated histological staining system to: (a) dispense a predetermined amount of an eosin staining solution to a specimen; (b) at least partially remove the eosin solution from the specimen; and (c) sequentially dispense to the specimen and remove from the specimen four additional solutions, wherein the four additional solutions sequentially dispensed and removed are selected from the group consisting of wash solutions and transfer solutions, and wherein at least two of the four additional solutions are transfer solutions.

In another aspect of the present disclosure is a method of staining a specimen comprising: (a) contacting a predetermined amount of a hematoxylin solution to the specimen; (b) at least partially removing the hematoxylin solution from the specimen; (c) contacting a predetermined amount of an alkaline solution to the specimen; (d) at least partially removing the alkaline solution from the specimen; (e) contacting a predetermined amount of at least one additional solution to the specimen; (f) at least partially removing the at least one additional solution from the specimen; (g) contacting a predetermined amount of an eosin staining solution to the specimen; (h) at least partially removing the eosin solution from the specimen; and (i) contacting a predetermined amount of an acid solution to the specimen. In some embodiments, no acid solution is dispensed prior to eosin staining. In some embodiments, the method further comprises dispensing an acid solution to the specimen after hematoxylin staining but prior to eosin staining. In some embodiments, the specimen is stained using an automated specimen processing apparatus. In some embodiments, the specimen is stained manually.

In another aspect of the present disclosure is a method of staining a specimen comprising: (a) introducing a predetermined amount of a hematoxylin solution to the specimen; (b) at least partially removing the hematoxylin solution from the specimen; (c) introducing a predetermined amount of an alkaline solution to the specimen; (d) at least partially removing the alkaline solution from the specimen; (e) introducing a predetermined amount of at least one additional solution to the specimen; (f) at least partially removing the at least one additional solution from the specimen; (g) introducing a predetermined amount of an eosin staining solution to the specimen; (h) at least partially removing the eosin solution from the specimen; and (i) introducing a predetermined amount of an acid solution to the specimen. In some embodiments, no acid solution is dispensed prior to eosin staining. In some embodiments, the method further comprises dispensing an acid solution to the specimen after hematoxylin staining but prior to eosin staining. In some embodiments, the specimen is stained using an automated specimen processing apparatus. In some embodiments, the specimen is stained using a dip-and-dunk technique. In some embodiments, the specimen is stained manually.

In another aspect of the present disclosure is a method of staining a specimen consisting of: (a) applying a predetermined amount of a counter staining solution to the specimen; (b) at least partially removing the eosin solution from the specimen; (c) applying a predetermined amount of an acid solution to the specimen; (d) at least partially removing the acid solution; and € applying an additional solution to the specimen; wherein no acid solution is applied between applying a primary staining solution to the specimen and the applying of the counter staining solution to the specimen. In some embodiments, the steps of applying are each performed manually.

In another aspect of the present disclosure is a method of staining a specimen consisting of: (a) applying a predetermined amount of a primary staining solution to the specimen; (b) at least partially removing the staining solution from the specimen; (c) applying a predetermined amount of a counter staining solution to the specimen; (d) at least partially removing the counter staining solution from the specimen; (e) applying a predetermined amount of an acid solution to the specimen; (f) at least partially removing the acid solution from the specimen; and (g) applying an additional solution to the specimen; wherein no acid solution is applied between applying a primary staining solution to the specimen and the applying of the counter staining solution to the specimen. In some embodiments, the steps of applying are each performed manually.

In another aspect of the present disclosure is method for processing a plurality of slides bearing biological tissue samples, comprising: performing a set of slide processing operations on the plurality of slides in one or more workstations while the slides in the plurality are held in spatially co-planar, substantially horizontal positions in a slide tray, wherein the set of slide processing operations includes staining samples on the slides in the spatially co-planar, substantially horizontal positions by flowing one or more stains from at least one reagent container, through a fluidics module, and out at least one dispense nozzle positioned above the slide tray, and solvent-exchanging; transporting the slide tray holding the plurality of slides to an automated coverslipper workstation after performing the set of slide processing operations that include at least staining and solvent-exchange; coverslipping the plurality of slides held in the slide tray with separate respective coverslips using the automated coverslipper workstation while the plurality of slides are held in spatially co-planar, substantially horizontal positions in the slide tray such that the coverslips on the slides are spaced apart from one another; and removing the slide tray holding the coverslipped slides from the automated coverslipper workstation; wherein the slide processing operations include dispensing a predetermined amount of a hematoxylin solution to the specimen; at least partially removing the hematoxylin solution from the specimen; dispensing a predetermined amount of an alkaline solution to the specimen; at least partially removing the alkaline solution from the specimen; dispensing a predetermined amount of at least one additional solution to the specimen; at least partially removing the at least one additional solution from the specimen; dispensing a predetermined amount of an eosin staining solution to the specimen; at least partially removing the eosin solution from the specimen; and dispensing a predetermined amount of an acid solution to the specimen. In some embodiments, the method is an automated method. In some embodiments, no acid solution is dispensed prior to eosin staining. In some embodiments, the method further comprises dispensing an acid solution to the specimen after hematoxylin staining but prior to eosin staining.

In another aspect of the present disclosure is an apparatus for automatically treating biological specimens, comprising: at least one slide tray holding a plurality of slides in substantially horizontal positions, wherein said biological specimens are located on said slides; one or more workstations that receive said slide tray and perform one or more slide processing operations on said plurality of slides held in said slide tray; a transporter that moves said slide tray into and out of said one or more workstations; a fluidics module in fluid communication with said one or more workstations that supplies a reagent to said one or more workstations; a pneumatics module in fluid communication with said one or more workstations and said fluidics module; wherein said pneumatics module supplies vacuum and/or pressurized gas to said one or more workstations and said fluidics module; and a control module in electrical communication with said transporter, said one or more workstations, said fluidics module and said pneumatics module, wherein said control module coordinates function of components of the apparatus during treatment of said biological specimens; wherein the system is configured such that no acid solution is dispensed between application of a stain and application of a counterstain. In some embodiments, the system is adapted to dispense a predetermined amount of a primary staining solution to the specimen; at least partially remove the primary staining solution from the specimen; dispense a predetermined amount of an alkaline solution to the specimen; at least partially remove the alkaline solution from the specimen; dispense a predetermined amount of at least one additional solution to the specimen; at least partially remove the at least one additional solution from the specimen; dispense a predetermined amount of a counterstaining solution to the specimen; at least partially remove the counterstaining solution from the specimen; and dispense a predetermined amount of an acid solution to the specimen. In some embodiments, the primary staining solution includes hematoxylin. In some embodiments, the counterstaining solution includes eosin. In some embodiments, the primary staining solution includes hematoxylin and the counterstaining solution includes eosin.

In some embodiments, the techniques described herein may also be applied to stains other than eosin. It is believed that an acidic post-treatment of the tissue after an acidic dye has stained will improve stain adherence by improving the tissue's charge state and increasing its tendency to hold onto the acidic dye. Hence the acidic-post treatment of the tissue could apply to any acid dye stain. Use of a more inert differentiation agent (e.g. a transfer solution) to control the progressive and regressive portions of the staining process may be used with any stain that can be both regressive and progressive.

BRIEF DESCRIPTION OF THE FIGURES

For a general understanding of the features of the disclosure, reference is made to the drawings. In the drawings, like reference numerals have been used throughout to identify identical elements.

FIG. 2A demonstrates these protocols as applied to breast tissue; while FIG. 2B demonstrates these protocols as applied to skin.

DETAILED DESCRIPTION

Figure 1:
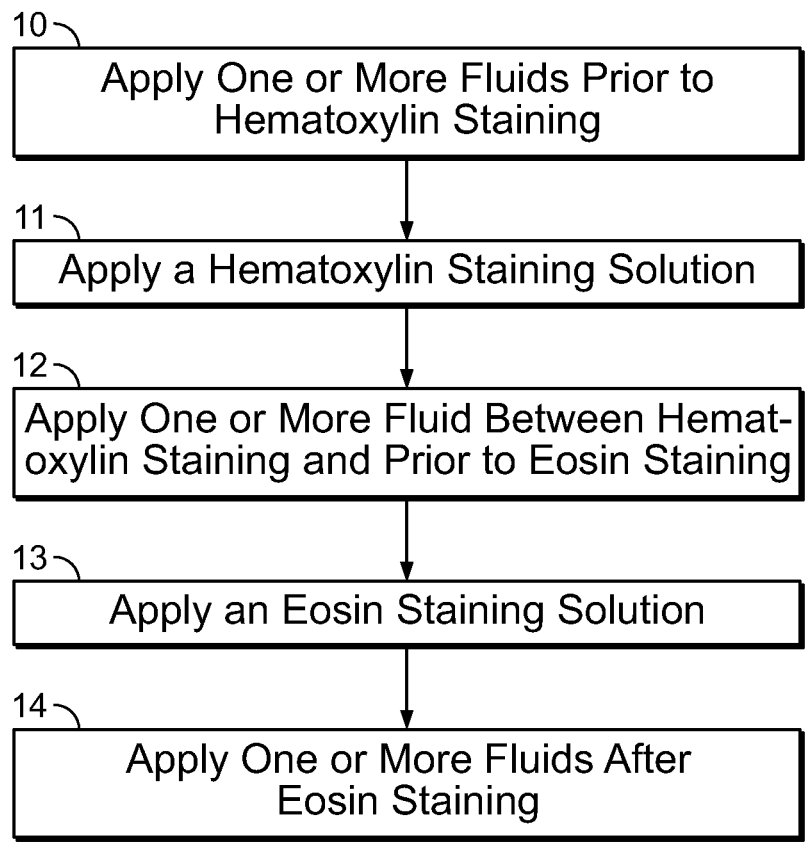
FIG. 1 outlines a general method of staining a tissue sample with a primary stain and a counterstain.
Figure 2A:
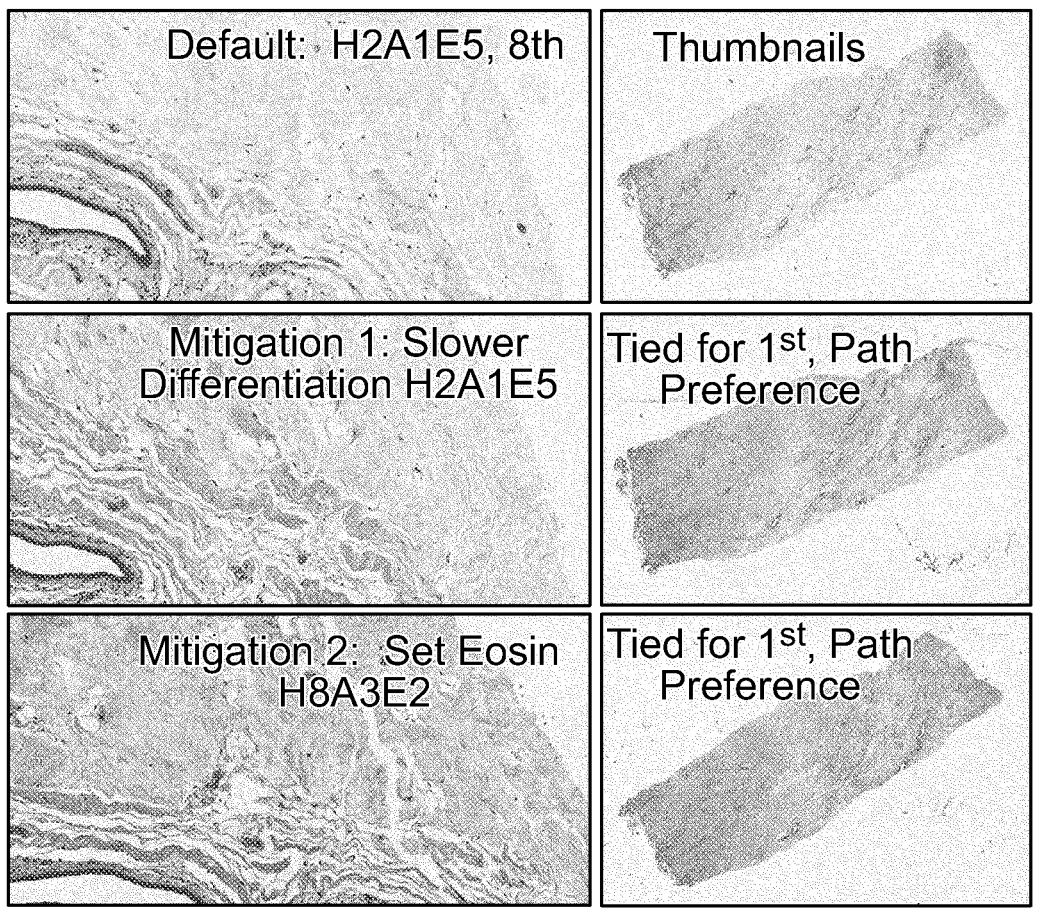
FIGS. 2A and 2B provide two sets of three images that comparatively illustrate eosin staining using a standard staining protocol (top), using a staining protocol where washing steps after eosin stain were removed (middle); and using a staining protocol where no acid solution was applied prior to eosin staining but acid wash was instead applied after eosin staining (bottom).
Figure 2B:
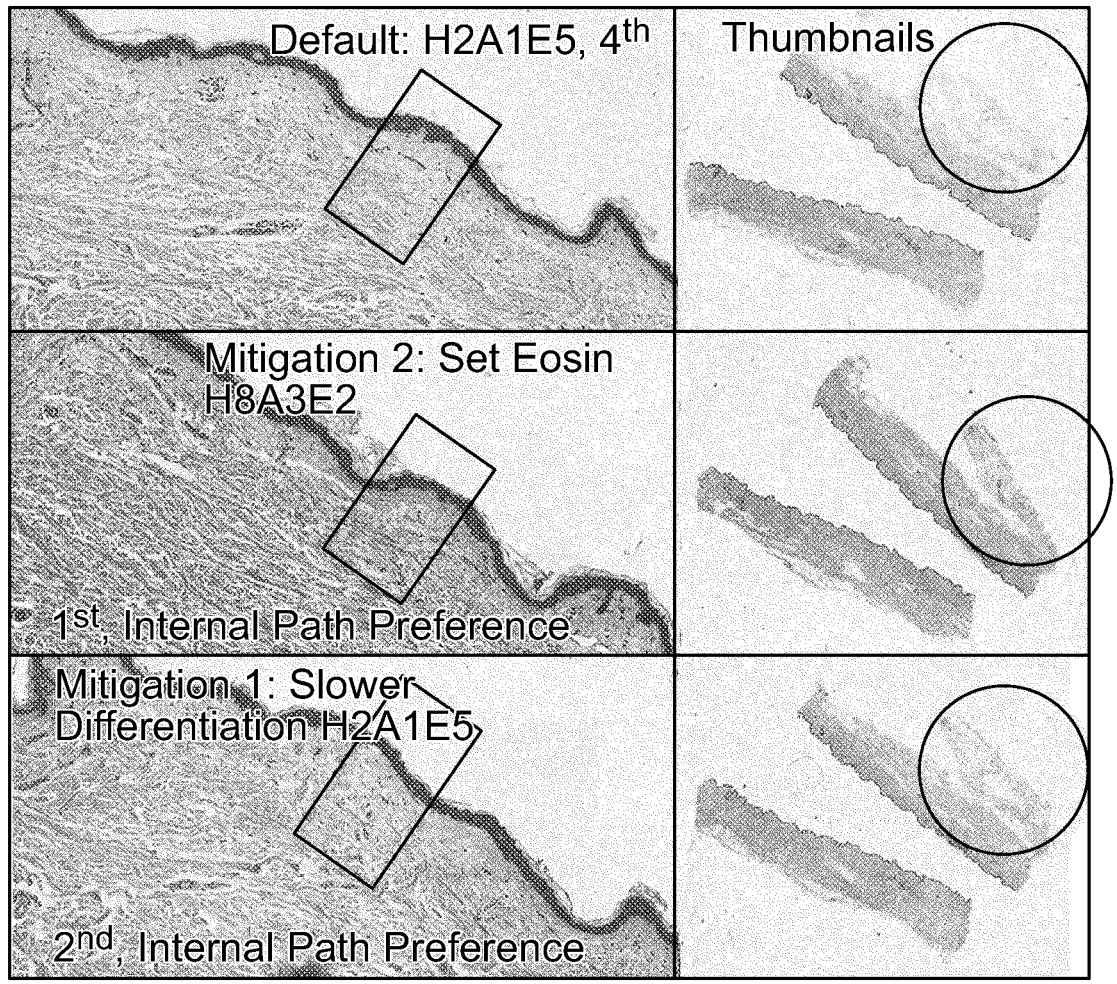

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "biological sample," "biological specimen," "tissue sample" or the like refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the term "fluid" refers to any liquid, including water, solvents, solutions (e.g. buffer solutions), etc. The term "fluids" also refers to any mixtures, colloids, suspensions, etc. The term "fluids" also encompasses reagents, stains, and other specimen processing agents (e.g. glues, fixatives, etc.) which may be applied to a microscope slide and/or specimen. The fluids may be aqueous or non-aqueous. Further examples include solutions or suspensions of antibodies, solutions or suspensions of nucleic acid probes, and solutions or suspensions of dye or stain molecules (e.g., H&E staining solutions, Pap staining solutions, etc.). Still further examples of fluids include solvents and/or solutions for deparaffinizing paraffin-embedded biological specimens, aqueous detergent solutions, and hydrocarbons (e.g., alkanes, isoalkanes and aromatic compounds such as xylene). Still further examples of fluids include solvents (and mixtures thereof) used to dehydrate or rehydrate biological specimens.

The term "HAE settings" as used herein refers to stain parameter settings available when creating HAE stain protocol. H is hematoxylin incubation time, A is acid wash incubation time, and E is eosin incubation time, where the setting are not the exact times of incubation, but correspond to the actual stain times in a known fashion.

As used herein, the term "slide" refers to any substrate (e.g., substrates made, in whole or in part, glass, quartz, plastic, silicon, etc.) of any suitable dimensions on which a biological specimen is placed for analysis, and more particularly to a "microscope slide" such as a standard 3 inch by 1 inch microscope slide or a standard 75 mm by 25 mm microscope slide. Examples of biological specimens that can be placed on a slide include, without limitation, a cytological smear, a thin tissue section (such as from a biopsy), and an array of biological specimens, for example a tissue array, a cellular array, a DNA array, an RNA array, a protein array, or any combination thereof. Thus, in one embodiment, tissue sections, DNA samples, RNA samples, and/or proteins are placed on a slide at particular locations. In some embodiments, the term slide may refer to SELDI and MALDI chips, and silicon wafers.

As used herein, the terms "stain," "staining," or the like as used herein generally refers to any treatment of a biological specimen that detects and/or differentiates the presence, location, and/or amount (such as concentration) of a particular molecule (such as a lipid, protein or nucleic acid) or particular structure (such as a normal or malignant cell, cytosol, nucleus, Golgi apparatus, or cytoskeleton) in the biological specimen. For example, staining can provide contrast between a particular molecule or a particular cellular structure and surrounding portions of a biological specimen, and the intensity of the staining can provide a measure of the amount of a particular molecule in the specimen. Staining can be used to aid in the viewing of molecules, cellular structures and organisms not only with bright-field microscopes, but also with other viewing tools, such as phase contrast microscopes, electron microscopes, and fluorescence microscopes. Some staining performed by the system 2 can be used to visualize an outline of a cell. Other staining performed by the system 2 may rely on certain cell components (such as molecules or structures) being stained without or with relatively little staining other cell components. Examples of types of staining methods performed by the system 2 include, without limitation, histochemical methods, immunohistochemical methods, and other methods based on reactions between molecules (including non-covalent binding interactions), such as hybridization reactions between nucleic acid molecules. Particular staining methods include, but are not limited to, primary staining methods (e.g., H&E staining, Pap staining, etc.), enzyme-linked immunohistochemical methods, and in situ RNA and DNA hybridization methods, such as fluorescence in situ hybridization (FISH).

The term "substantially horizontal" generally refers to an angle within about +/−2 degrees of horizontal, for example, within about +/−1 degree of horizontal such as within about +/−0.8 degrees of horizontal. Substantially horizontal also refers to ranges of small angles from horizontal, for example, angles between about 0.1 degrees and 1.8 degrees from horizontal, such as angles between about 0.2 degrees and about 1.2 degrees, for example angles between about 0.3 degrees and about, 0.8 degrees. A slide that is held substantially horizontal will have an orientation such that the large surfaces of the slide are generally facing up and down. In particular embodiments, a rectangular slide such as a microscope slide that is held substantially horizontal will have an angle with respect to horizontal of between about 0.0 degrees and about 2.0 degrees along its short axis and an angle with respect to horizontal of between about 0.0 degrees and 2.0 degrees along its long axis, again with the large surfaces of the slide generally facing up and down. Typically, if a slide has a barcode affixed to one end, a slide held in a substantially horizontal position will have a downward slope away from the barcode along its long axis.

The term "workstation" refers to a position or location in a disclosed system where at least one slide processing operation is performed, and more particularly to a modular unit inside of which one or more slide processing operations are performed on a plurality of slides held in a slide tray (for example, a plurality of slides held in a substantially horizontal position in a slide tray). A workstation can receive a slide tray in substantially a single position so that moveable components of the workstation can locate individual slides within the slide tray and precisely perform a slide processing operation on one or more slides in the tray (such as deliver a fluid, solution, reagent, etc. to a particular slide or portion thereof). Examples of slide processing operations that can be performed by a workstation include heating, drying, de-paraffinizing, pre-stain prepping, rinsing, solvent exchanging, staining and coverslipping, and combinations thereof. In some embodiments, a workstation dispenses two or more fluids, solutions, reagents, etc. to a slide without the slides being moved from one workstation to another during a slide-processing operation or operations such as de-paraffinizing, staining and/or solvent exchanging. Thus, in one embodiment, a workstation includes a delivery means such as a nozzle or a manifold of nozzles through which fluids, solutions, reagents, etc. are delivered to slides held in a slide tray, which delivery means can be moveable or fixed in position within the workstation. Thus, in some embodiments, a workstation encompasses an active, mechanical device that delivers fluids (such as two or more fluids) to groups of slides held together in a slide tray. Thus, in one non-limiting aspect a work station is not a reagent bath in which slide are immersed. In other embodiments, a workstation can include a heating element and can further include a heat directing element. A heat directing element can help to spread heat more evenly between slides held in a slide tray. A workstation also can include one or more radiant heaters. A workstation also can include a tray tilter (such as a tilt pan) to lift one end of a slide tray to assist with liquid removal from the tray. Alternatively, a workstation can include a mechanism to tilt one or more individual slides in a slide tray away from a horizontal position. Workstations can further include various components that move or control other workstation components, such as stepper motors, screw drives and microprocessors. Other components that can be included in a workstation include hoses, belts, tracks, fluidics connections, metering pumps, metering valves, electrical connections, sensors and the like. In another embodiment, a workstation is a modular unit that can be interchanged between two or more positions within a disclosed system and electrically and fluidically connected to the system via a common electronics backplane and a common fluidics manifold. In yet another embodiment, a workstation can include a light source, such as a UV light source for curing an adhesive for holding a coverslip in place on a slide.

Overview

The present disclosure relates to methods of staining a biological sample with a primary stain (e.g. hematoxylin) and a counterstain (e.g. eosin) and, in particular, methods directed methods of enhancing staining with the counterstain. In some embodiments, the methods utilize an automated specimen processing apparatus. Applicants have unexpectedly discovered that by altering the sequence, i.e. ordering, timing, etc., of introducing or dispensing certain fluids to a substrate, that stain intensities and consistencies may be enhanced as compared with standard staining protocols.

In some embodiments, the solutions are manually applied or introduced to a sample or applied using a dip-and-dunk technique. In some embodiments, a sample is contacted with a fluid and that fluid is subsequently removed prior to the introducing of another fluid.

In other embodiments, the solutions are introduced (e.g. dispensed) to a sample, such as by an automated staining apparatus. The skilled artisan will appreciate that the dispensing of any fluid refers to the application of that fluid to a sample or a substrate (e.g. a slide). The skilled artisan will appreciate that after a fluid is dispensed, it must be at least partially removed such that a subsequently dispensed fluid is able to contact a specimen disposed on a substrate. As such, some embodiments herein may refer to sequential, successive, or iterative applications of a fluid. It should be inferred, unless otherwise specified, that a first fluid dispensed is at least partially removed prior to the dispensing of a second fluid.

In some embodiments, the staining system of the present disclosure is capable of performing all or some of the steps of processing, staining and coverslipping of substrate (e.g. slide) mounted specimens. In some embodiments, slides bearing biological specimens are placed on a slide tray, and the slide tray bearing the sample slides are loaded into the system where the slides are conducted through a sequence of steps in which the slides are baked, de-waxed, stained and finally coverslipped. In some embodiments, the methods disclosed herein are directed to a method of automatically preparing tissue samples on microscope slides (or other substrates) for pathological analysis, comprising baking the tissue sample onto the slide by having the instrument apply heat to the tissue sufficient to adhere it to the slide; deparaffinizing the tissue sample by contacting it with deparaffinizing fluid at a temperature above the melting point of the paraffin, and subsequently rinsing the liquefied paraffin away; staining the tissue sample by contacting it with a staining reagent; and coverslipping the slide by contacting the stained tissue sample on the slide with a pre-glued coverslip and an adhesive activating fluid. In some embodiments, the methods disclosed herein utilize only some of the aforementioned steps.

In some embodiments, staining of a specimen with a primary stain (e.g. hematoxylin) and a counterstain (e.g. eosin) is accomplished through the use of a specimen processing system. In some embodiments, a specimen processing apparatus is an automated apparatus, such as the BENCHMARK XT instrument, the BenchMark Special Stains instrument, the NexES Special Stainer instrument, the SYMPHONY instrument, or the BENCHMARK ULTRA instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 2003/0211630 and 2004/0052685, each of which is incorporated herein by reference in its entirety.

Examples of other commercially available specimen processing systems through which hematoxylin and eosin staining compositions may be applied include the VENTANA SYMPHONY (individual slide stainer) and the VENTANA HE 600 (individual slide stainer) series; the Dako CoverStainer (batch stainer) from Agilent Technologies; the Leica ST4020 Small Linear Stainer (batch stainer), Leica ST5020 Multistainer (batch stainer), and the Leica ST5010 Autostainer XL series (batch stainer) H&E stainers from Leica Biosystems Nussloch GmbH.

In some embodiments, the automated specimen processing apparatus may include a carousel for holding a plurality of substrates, e.g. microscope slides, wherein each substrate includes a biological sample to be stained. In some embodiments, the automatic staining equipment can also include a device for rotating the carousel at predetermined speeds and a mechanism for directing and controlling application of reagents, including the hematoxylin and eosin staining compositions, onto the substrates and samples during rotation of the carousel. In some embodiments, once the slides are loaded into the instrument, test protocols will dictate which fluids are dispensed onto the substrates at specific times. At the appropriate time, in some embodiments, a dispenser rack will rotate to align a correct fluid over a substrate and the instrument will dispense a predetermined amount of a fluids onto the substrate. In some embodiments, the instrument will allow the fluid to remain in contact with the biological sample for a predetermined amount of time.

In some embodiments, the system is an automated slide processing system that includes a slide tray holding a plurality of slides in a substantially horizontal position (such as in two rows where the slides are held at an angle between about 0.2 degrees and about 1.2 degrees from horizontal) and one or more workstations (for example, arranged in a vertical stack) that receive the slide tray and perform one or more slide processing operations on slides in the slide tray. In some embodiments, the workstation can perform a slide processing operation on one or more individual slides in a slide tray, for example, at least two or four slides in a slide tray, or it can simultaneously perform a slide processing operation on all of the slides in a slide tray. In some embodiments, the one or more workstations dispense a reagent to slides in the slide tray without a substantial amount of the reagent that contacts a first slide contacting a second slide, thereby minimizing cross-contamination between slides. Such workstations can include one or more directional nozzles that dispense the reagent onto the slides, for example, the one or more directional nozzles can include a pair of directional nozzles that dispense the reagent in opposite directions across a surface of a slide. In more particular embodiments, the one or more directional nozzles can further include a directional nozzle that dispenses the reagent towards a bottom surface of a slide. In other particular embodiments, the one or more workstations can simultaneously dispense a reagent (for example, the same reagent) to at least two slides held in a slide tray within a given workstation, or the one or more workstations can simultaneously dispense a reagent (such as the same reagent) to all of the slides held in the slide tray within a given workstation. Additional system components and tray configurations (as well as control systems) are described in U.S. Pat. Nos. 8,663,991, 7,468,161, and 9,528,918, the disclosures of which are hereby incorporated by reference herein in their entireties.

In some embodiments, the specimen processing apparatus is configured to dispense a predetermined amount of each fluid (including hematoxylin and eosin staining solutions) to the specimen. In some embodiments, the specimen processing apparatus is configured to dispense at least about 200 microliters of a fluid to a biological sample. In other embodiments, at least about 350 microliters of a fluid is dispensed to the biological sample. In yet other embodiments, at least about 1000 microliters of a fluid is dispensed to the biological sample. In further embodiments, between about 200 microliters and about 2000 microliters of a fluid is dispensed to the biological sample. In even further embodiments, between about 200 microliters and about 1500 microliters of a fluid is dispensed to the biological sample. In some embodiments, about 400 microliters of a fluid is dispensed. In some embodiments, about 800 microliters of a fluid is dispensed. In some embodiments, about 1400 microliters of a fluid is dispensed. The skilled artisan will appreciate that different fluids may be dispensed in different amounts, e.g. a primary stain be dispensed in an amount of about 1400 microliters and a wash solution may be dispensed in an amount of about 400 microliters. The skilled artisan will also appreciate that between any two dispensings (i.e. dispensing steps) of the same fluid, that the amount in any particular dispensing may be the same or different. For example, a first dispensing of a wash solution may have a volume of 200 microliters, while a second dispensing of a wash solution may have a volume of 400 microliters.

In some embodiments, the automated specimen processing apparatus is used to sequentially or iteratively apply a series of fluids onto a specimen bearing slide. For example, the automated specimen processing system may be adapted to dispense hematoxylin and eosin stains to a specimen. In some embodiments, the specimen processing apparatus is configured to apply other fluids both before and after dispensing of the hematoxylin and eosin staining compositions to the biological sample. For example, the automated specimen processing apparatus may be equipped to dispense an aqueous wash solution which includes water, a diol, and a surfactant. The automated specimen processing apparatus may also be equipped to dispense an acid solution (e.g. one including water, a diol, and a weak acid) or an alkaline solution (e.g. one including water, a diol, and a weak base). The automated specimen processing apparatus may be yet further equipped to dispense an organic solution (e.g. a mixture of aliphatic hydrocarbons) or a transfer solution (e.g. one including an ether).

In some embodiments, the transfer solutions include one or more glycol ethers, such as one or more propylene-based glycol ethers (e.g., propylene glycol ethers, di(propylene glycol) ethers, and tri(propylene glycol) ethers), ethylene-based glycol ethers (e.g., ethylene glycol ethers, di(ethylene glycol) ethers, and tri(ethylene glycol) ethers), and functional analogs thereof. In some embodiments, the transfer solutions includes at least substantially exclusively a mixture of di(propylene glycol) methyl ether and di(propylene glycol) propyl ether. In other embodiments, the transfer solutions includes at least substantially exclusively di(propylene glycol) propyl ether. Suitable glycol ethers include, for example, DOWANOL products available from Dow Chemical Company (Midland, Michigan).

In some embodiments, the washing solutions include a surfactant to facilitate spreading of the washing liquids over the specimen-bearing surfaces of the slides. The surfactant can be selected to have little or no negative impact on specimen-processing operations subsequent to washing. For example, the surfactant can be non-ionic so as to reduce or prevent undesirable buffering. In at least some cases, the surfactant includes an ethoxylated alcohol and/or a glycol ether. Suitable ethoxylated alcohol surfactants include, for example, TOMADOL® 900 available from Air Products and Chemicals, Inc. (Allentown, Pennsylvania) and Merpol SH available from Stepan Company (Northfield, Illinois). Suitable glycol ether surfactants include, for example, TERGITOL® NP-9 available from Dow Chemical Company (Midland, Michigan).

In some embodiments, the acid solutions include deionized water, an acid (e.g., acetic acid), and a solvent. As with the washing solutions, the solvent can be a polyol, such as ethylene glycol, propylene glycol, or a combination thereof. For example, the stain-differentiating liquid can include greater than 10% by volume polyol.

In some embodiments, the alkaline solutions include deionized water, a base, and a solvent. In some embodiments, the solvent can be a polyol, such as ethylene glycol, propylene glycol, or a combination thereof. For example, the alkaline solutions may include greater than 10% by volume polyol, such as from 10% to 60%> by volume polyol. In some embodiments, the base is tris(hydroxymethyl)aminomethane ("TRIS").

Additional wash solutions, transfer solutions, acid solutions, and alkaline solutions, as well as their methods of application, and instruments for applying them are described in United States Patent Application Publication No. 2016/0282374, the disclosure of which is hereby incorporated by reference herein in its entirety.

The automated specimen processing apparatus may be equipped to iteratively dispense (and remove) the same fluid a predetermined number of times. In some embodiments, it is beneficial to repeatedly dispense, remove, and reapply a particular fluid, as opposed to leaving a single fluid in contact with the specimen for a predetermined period of time. It is believed that repeated dispense and removal steps are superior to single dispenses with longer incubation times. For instance, repeated dispenses provide for a renewal of fluid or solution concentrations; it prevents standing currents, and it facilitates at least partial mixing. For fluids that are adding or removing dye (staining or differentiating), renewal of fluid will maintain an appropriate concentration of dye in the fluid relative to the tissue. For example, during staining, maintaining a high concentration of dye in the fluid relative to the tissue will speed up and intensify the stain. Similarly, maintaining low concentrations of dye in wash will remove dye and differentiate more quickly and effectively. In terms of standing currents, allowing pools of fluid to sit allows spatially inhomogeneous convection currents to form, which can impact stain consistency, and in terms of mixing, reapplying fluid allows a new bath of fluid easy access to the tissue, while a standing pool must wait for diffusion to effectively mix it. For example, although a wash solution may be repeatedly dispensed, removed, and reapplied four times sequentially, such a repetitive process may offer benefits as compared with leaving a single volume of wash solution in contact with the biological sample for the same duration of time. In some embodiments, the washing of a sample includes several iterations (e.g., 2, 3, or another suitable number of iterations) of dispensing a washing solution onto the slides, allowing the dispensed washing liquid to remain in contact with the specimens for a suitable period of time so as to wholly or incrementally wash the specimens (e.g., while the washing liquid is in the form of a puddle having a shape maintained at least partially by surface tension), and then removing the dispensed washing liquid. The time during which the dispensed washing liquid is in contact with the specimens can be, for example, a time within a range from 5 seconds to 30 seconds.

In the context of H&E staining, the automated specimen processing apparatus may dispense a hematoxylin staining solution to a specimen disposed on a slide. The dispensing of the hematoxylin staining solution facilitates the formation of a first puddle on the slide, which is left in contact with the specimen for a predetermined period of time. Subsequently, this first puddle is at least partially removed to at least partially uncover the specimen. Next, one or more fluids may be applied prior to staining with eosin, whereby each of the one or more fluids applied prior to eosin staining are removed after remaining in contact with the specimen for a predetermined amount of time. In some embodiments, at least one of an aqueous wash solution, acidic solution, or an alkaline solution is applied prior to eosin staining.

With reference to FIG. 1, and in the context of H&E staining, the automated processing system may generally perform the following steps: (1) apply one or more fluids prior to hematoxylin staining (step 10); (2) apply a hematoxylin staining solution (step 11); (3) apply one or more fluids between hematoxylin staining and prior to eosin staining (step 12); (4) apply a counterstaining solution (step 13); and (5) apply one or more fluids after eosin staining (step 14). In some embodiments, the counterstaining solution comprises eosin. In some embodiments, each fluid is dispensed in a predetermined amount and allowed to remain in contact with the specimen for a predetermined amount of time. In other embodiments, each of a wash solution, and acid solution, or an alkaline solution are applied at step (3) at least once, and these fluids may be applied in any order. In yet other embodiments, each of a wash solution, an acid solution, or an alkaline solution are applied at step (3) at least once, and these fluids may be applied in any order, and at least one of these fluids is applied more than once at step (3). In some embodiments, no acid solution is applied during step (3). In other embodiments, no acid solution is applied during step (3), but an alkaline solution and a wash solution are each applied at least once. In some embodiments, an acid solution is applied during step (3), and another aliquot of acid solution is dispensed immediately following dispensing and at least partial remove of the counterstaining solution. In other embodiments, all three of a wash solution, an alkaline solution, and an acid solution are applied during step (3), and an acid solution is applied during step (5).

In some embodiments, all three of the aqueous wash solution, the acidic solution, and the alkaline solution are applied sequentially and prior to eosin staining. For example, the automated specimen processing apparatus may perform the following operations following staining with hematoxylin: (i) dispense an acidic solution; (ii) dispense a wash solution; (iii) dispense an alkaline solution; (iv) dispense a wash solution; (v) dispense an eosin staining solution; and (vi) dispense one or more fluids after eosin staining. Alternatively, and by way of another example, the automated specimen processing apparatus may perform the following operations following staining with hematoxylin: (i) dispense a wash solution; (ii) dispense an acidic solution; (iii) dispense a wash solution; (iv) dispense an alkaline solution; (v) dispense a wash solution; (vi) dispense an eosin staining solution; and (vii) dispense one or more fluids after eosin staining. In some embodiments, at least one wash solution is dispensed following staining with eosin. In some embodiments, acid solution is dispensed immediately after eosin staining.

In some embodiments, only aqueous wash solutions and an alkaline solution are applied prior to eosin staining, i.e. no acid solution is applied prior to eosin staining. For example, the automated specimen processing apparatus may perform the following operations following staining with hematoxylin: (i) dispense an alkaline solution; (ii) dispense a "wash" solution; (iii) dispense an eosin staining solution; and (iv) dispense an acid solution. In this particular embodiment, the specimen is not contacted with an acid solution prior to eosin staining. Rather, the specimen is contacted with the acid solution immediately following eosin staining. As noted further herein, Applicants have discovered that staining according to this ordering of fluid dispense steps results in improved eosin staining as compared with control samples (see the Examples section herein).

By way of another example, the automated specimen processing apparatus may perform the following operations following staining with hematoxylin: (i) dispense a wash solution; (ii) dispense an alkaline solution; (iii) dispense a "wash" solution; (iv) dispense an eosin staining solution; and (v) dispense an acid solution. In some embodiments, step (i) is performed twice prior to dispensing of the alkaline solution. Like in the foregoing example, in this particular example, the specimen is not contacted with an acid solution prior to eosin staining. Again, the specimen is contacted with the acid solution immediately following eosin staining.

In an alternative method, the automated specimen processing apparatus may perform the following operations following staining with hematoxylin: (i) dispense an acid solution; (ii) dispense a "wash" solution; (iii) dispense an alkaline solution; (iv) dispense a wash solution; (v) dispense an eosin staining solution; and (vi) dispense an acid solution. In another alternative method, the automated specimen processing apparatus may perform the following operations following staining with hematoxylin: (i) dispense a wash solution; (ii) dispense an acid solution; (iii) dispense a "wash" solution; (iv) dispense an alkaline solution; (v) dispense a wash solution; (vi) dispense an eosin staining solution; and (vii) dispense an acid solution.

In yet another alternative method, the automated specimen processing apparatus may perform the following operations following staining with hematoxylin: (i) dispense an alkaline solution; (ii) dispense a "wash" solution; (iii) dispense an acid solution; (iv) dispense a "wash" solution; (v) dispense an eosin staining solution; and (vi) dispense an acid solution. In yet a further alternative method, the automated specimen processing apparatus may perform the following operations following staining with hematoxylin: (i) dispense a wash solution; (ii) dispense an alkaline solution; (iii) dispense a "wash" solution; (iv) dispense an acid solution; (v) dispense a "wash" solution; (vi) dispense an eosin staining solution; and (vii) dispense an acid solution.

As noted above, following staining with eosin, one or more fluids are sequentially applied to the specimen. In particular, following staining with eosin, a wash solution and/or a transfer solution may each be dispensed one or more times to the specimen following staining with eosin. For example, immediately following staining with eosin, a wash solution may be dispensed and removed four times sequentially. Subsequent to this, additional solutions may be applied, e.g. dispensing at least one of a transfer solution and/or an organic solution after the dispensing of the last wash solution.

In some embodiments, the automated specimen processing apparatus may dispense a wash solution 1 to 6 times sequentially after eosin staining, but prior to the dispensing of a different fluid. By way of example, the automated specimen processing apparatus may perform the following operations following staining with eosin: (i) dispense a wash solution; (ii) dispense a wash solution; (iii) dispense a wash solution; (iv) dispense a wash solution; (v) dispense a transfer solution; (vii) dispense a transfer solution; and (viii) dispense an organic solution. Following this example, in some embodiments, rather than dispense a wash solution four times, the system may be adapted to dispense the rinse fluid less than four times, for example three times, two times, or just once following eosin staining.

In some embodiments, one or all of the steps of dispensing a wash solution immediately after eosin staining may be substituted one-for-one with a step of dispensing a transfer solution. For example, if wash solution is dispensed four times successively (i.e. dispense the fluid, allow it to remain in contact with the specimen for a predetermined amount of time, and at least partially removing the fluid), the system may be adapted to dispense transfer solution four times successively instead, and prior to any yet subsequent fluid dispensing steps, including further transfer solution dispensing steps. Alternatively, if wash solution is dispensed four times successively, the system may be adapted to dispense wash solution twice and transfer solution twice, and prior to any yet subsequent fluid dispensing steps, including further transfer solution dispensing steps. In some embodiments, the automated specimen processing apparatus may dispense wash solution one or twice in succession immediately following staining with eosin (and after removal of the eosin); followed by the dispensing of transfer solution at least twice in succession. In some embodiments, the automated specimen processing apparatus may alternate between dispensing wash solution and dispensing transfer solution, e.g. dispense wash solution, dispense transfer solution, dispense wash solution, and dispense transfer solution.

In some embodiments, all of the wash solution dispensing steps following eosin staining are removed and replaced with the steps of dispensing transfer solution. By way of another example, the automated specimen processing apparatus may perform the following operations immediately following staining with eosin: (i) dispense a transfer solution; (ii) dispense a transfer solution; (iii) dispense a transfer solution; (iv) dispense a transfer solution; and (v) dispense an organic solution. By way of yet another example, the automated specimen processing apparatus may perform the following operations immediately following staining with eosin: (i) dispense a transfer solution; (ii) dispense a transfer solution; (iii) dispense a transfer solution; (iv) dispense a transfer solution; and (v) dispense an organic solution, wherein no acid wash step is performed between hematoxylin staining and eosin staining. By way of yet a further example, the automated specimen processing apparatus may perform the following operations immediately following staining with eosin: (i) dispense an acid solution; (ii) dispense a was solution; (iii) dispense a transfer solution; (iv) dispense a transfer solution; (v) dispense a transfer solution; and (vi) dispense an organic solution. In some embodiments, transfer solution may be dispensed from between about 2 times to about 12 times immediately after eosin staining and prior to further processing (including further fluid dispensing steps).

In one embodiment, the automated specimen processing apparatus may perform the following operations following staining with hematoxylin: (i) dispense an alkaline solution; (ii) dispense a "wash" solution; (iii) dispense an eosin staining solution; (iv) dispense an acid solution; (v) dispense at least one transfer solution; wherein no wash steps are performed following staining with eosin. In another, the automated specimen processing apparatus may perform the following operations following staining with hematoxylin: (i) dispense an alkaline solution; (ii) dispense a "wash" solution; (iii) dispense an eosin staining solution; (iv) dispense an acid solution; (v) dispense a transfer solution; (vi) dispense a transfer solution; (vii) dispense a transfer solution; and (viii) dispense a transfer solution. Of course, other downstream dispensing steps may be incorporated.

In some embodiments, the automated specimen processing apparatus includes a heating or cooling device (such as a conductive heater or a Peltier device) such that at least one of the biological sample or the fluids applied to the sample are heated to a predetermined temperature and/or for a predetermined amount of time. In some embodiments, the specimen processing apparatus can be configured to provide conductive and/or radiant heating. Conductive heating can be provided via a plate with a resistive heater. One or more lamps can provide radiant heating. The apparatus can controllably increase or decrease the temperature of the specimens. Suitable examples of slide heating devices are described in U.S. Pat. Nos. 7,425,306 and 6,582,962, the disclosures of which are hereby incorporated by reference herein in their entireties.

In some embodiments, at least one of the sample or the dispensed fluid is heated to a temperature ranging from between about 30° ° C. to about 45° C. In other embodiments, the specimen processing apparatus heats at least one of the sample or the dispensed fluid to a temperature ranging from between about 35° C. to about 40° C. In some embodiments, the specimen processing apparatus may heat the sample, the dispensed fluid, or slide for a predetermined period of time, e.g. for between 10 minutes and 40 minutes. Any of the staining reagents and/or fluids dispensed to the specimen or slide may be heated.

In some embodiments, the specimen processing apparatus is configured to apply yet other fluids both before and after dispensing of the hematoxylin and eosin staining compositions to the biological sample. Indeed, the specimen processing apparatus can apply a wide range of substances to the specimen including, without limitation, stains, probes, reagents, rinses, and/or conditioners, or any of the other fluids recited herein. Probes can be an isolated nucleic acid or an isolated synthetic oligonucleotide, attached to a detectable label. Labels can include radioactive isotopes, enzyme substrates, co-factors, ligands, chemiluminescent or fluorescent agents, haptens, and enzymes. In some embodiments, the specimen processing apparatus facilitates performing an immunoassay, for example by incubation with one or more antibodies specific for a particular target bacterium, and detected using a label (such as a label on the antibody or via use of a labeled secondary antibody). Exemplary detectable labels include fluorophores, haptens, enzymes, radiolabels, and others known in the art.

In some embodiments, if the specimen is a sample embedded in paraffin, the sample can be deparaffinized with the specimen processing apparatus using appropriate deparaffinizing fluid(s). In some embodiments, and after a waste remover device of a specimen processing apparatus removes any deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

Analysis of a biological specimen stained in accordance with the procedures described herein can be automated, and facilitated by a computer analysis and/or image analysis system. In some embodiments, light microscopy is utilized for image analysis. Certain disclosed embodiments involve acquiring digital images. This can be done by coupling a digital camera to a microscope (e.g. a brightfield microscope). Digital images obtained of stained samples are analyzed using image analysis software. The samples also can be evaluated qualitatively and semi-quantitatively. Qualitative assessment includes assessing the staining intensity, identifying the positively-staining cells and the intracellular compartments involved in staining, and evaluating the overall sample or slide quality. Separate evaluations are performed on the test samples and this analysis can include a comparison to known average values to determine if the samples represent an abnormal state.

EXAMPLES

Example 1-Replace Wash Dispense with 2-Transfer Solution Dispenses—Dialability Determination Staining runs were performed with an instrument in a Control configuration and with the alternative protocols set forth in Table 1. Also staining runs were performed using a "mitigation" technique where wash dispense steps are replaced by two (2) transfer solution steps for a total of four (4) transfer solution steps (see FIG. 3). The test configuration is achieved by a script change. The following staining runs were performed and then compared in each configuration:

TABLE 1

Staining protocol runs, where the integers 1 through 10 represent relative durations for which the specified fluid remains in contact with the specimen, where lower integers represent shorter amounts of time, and higher integers represent longer time durations.

| Staining Protocol | Hematoxylin Level | Acid Wash | Eosin Level | Incubation Rationale |
|---|---|---|---|---|
| H2A1E5 | 2 | 1 | 5 | DEFAULT |
| H1A0E1 | 1 | 0 | 1 | L, 0, L |
| H1A0E5 | 1 | 0 | 5 | L, 0, M |
| H1A3E1 | 1 | 3 | 1 | L, M, L (Lightest) |
| H1A3E5 | 1 | 3 | 5 | L, M, M |
| H1A5E5 | 1 | 5 | 5 | L, H, M |
| H5A0E5 | 5 | 0 | 5 | M, 0, M |
| H5A1E1 | 5 | 1 | 1 | M, L, L |
| H5A1E5 | 5 | 1 | 5 | M, L, M |
| H5A3E1 | 5 | 3 | 1 | M, H, L |
| H5A3E5 | 5 | 3 | 5 | M, H, M |
| H10A0E1 | 10 | 0 | 1 | H, 0, L |
| H10A1E1 | 10 | 1 | 1 | H, L, L |
| H10A1E10 | 10 | 1 | 10 | H, L, H (Darkest) |
| H10A3E1 | 10 | 3 | 1 | H, H, L |
| H10A3E5 | 10 | 3 | 5 | H, H, M |
| H1A1E10 | 1 | 1 | 10 | H, L, H |

A single multi-tissue block (MTB) containing breast, colon, skin, spleen and tonsil was used. Two slides were stained in each staining run. Staining runs were first performed in the Control configuration. Test and control slides for each staining protocol were compared and scored by a pathologist as follows:
- −3: [Attribute] of test slide markedly less than control
- −2: [Attribute] of test slide substantially less than control
- −1: [Attribute] of test slide slightly less than control
- 0: [Attribute] of test slide approximately equal to control
- 1: [Attribute] of test slide slightly more than control
- 2: [Attribute] of test slide substantially more than control
- 3: [Attribute] of test slide markedly more than control, where "Slightly"=Difference noticeable only upon repeat inspection; "Substantially"=Difference noticeable on first inspection," and "Markedly"=Difference is blatant on first inspection (i.e. difference noticeable with no microscope).

Slides were evaluated for (i) Eosin Staining Consistency—appropriate and consistent staining of eosinophilic tissue components such as collagen and fat throughout tissue sample on a single slide; and (ii) Eosin Differentiation—differentiation of eosinophilic tissue components such as collagen, smooth muscle and red blood cells with readily visible shades of pink.

The consumables listed in Table 2 were utilized during the experiment:

TABLE 2

Consumable materials utilized during the experiment, where all materials are available from Ventana Medical Systems, Tucson, AZ, USA.

| Description | Part Number |
|---|---|
| VENTANA HE 600 Organic Solution | 07095163001 |
| VENTANA HE 600 Transfer Solution | 06544380001 |
| VENTANA HE 600 Wash | 06544312001 |
| VENTANA HE 600 Hematoxylin | 07024282001 |
| VENTANA HE 600 Differentiating Solution | 06544339001 |
| VENTANA HE600 Bluing | 06544347001 |
| VENTANA HE 600 Eosin | 06544304001 |
| VENTANA HE 600 Cleaning Solution | 07257538001 |
| VENTANA HE 600 Coverslip Activator | 07287062001 |
| VENTANA HE 600 Glass Coverslips | 06711120001 |

The average pathology score for each of the staining attributes for paired tissue of each tissue type are shown in Table 3.

TABLE 3

Average pathology scores, namely average pathology scores of staining attributes for test slides.

| Tissue | Hematoxylin Intensity | Eosin Intensity | Eosin Differentiation | Preference | Eosin Consistency |
|---|---|---|---|---|---|
| Breast | 1.0 | 2.0 | 0.2 | 2.6 | 2.6 |
| Colon | 0.9 | 1.0 | 0.0 | 0.4 | 1.8 |
| Skin | 0.8 | 1.5 | 0.1 | 2.0 | 2.4 |
| Spleen | 0.6 | 1.5 | −0.1 | 0.1 | 0.1 |
| Tonsil | 1.1 | 1.6 | 0.0 | 0.0 | 1.1 |

The values in Table 3 are average values for each staining attribute across all slides and staining protocols based on the scoring method listed above.

A slight increase in hematoxylin staining intensity is observed for each tissue type with the mitigation in place. The increase in staining intensity for eosin with the mitigation in place is slight to substantial for each tissue type. The mitigation has no effect on eosin differentiation for any of the tissues used in this study.

The slide preference is a subjective score where the pathologist chooses preference over the tissue stained with the nominal stain or the mitigation. The preference for breast and skin for the mitigation tissue is substantial. There is a very slight preference for the mitigation for colon and spleen and no preference for tonsil. The mitigation, change wash dispense steps to two transfer solution steps has a substantial effect on the eosin consistency in which it was designed to correct.

Eosin staining intensity is slight to substantially more intense for each of the tissues examined in this study. The mitigation increases hematoxylin slightly. Eosin differentiation is not effected by the mitigation. Eosin consistency substantially improved in breast, colon, and skin with mitigation. The pathologist who scored the tissue for this study (one) prefers breast and skin with mitigation in place. The pathologist who scored the tissue for this study had no preference for colon, spleen, and tonsil. The images suggest less dialability is available with the mitigation in place.

Overall this study demonstrated strong improvement in eosin consistency across a tissue, along with improvement in pathologist preference in tissues displaying inconsistency, while only strongly impacting one other stain feature, eosin intensity.

Example 2—Light Eosin Replace Wash Differentiation with Two-Transfer Solution Dispenses: Diagnostic Clarity This study was developed to determine if the mitigation procedure described in Example caused any unintended consequences in ability to diagnose tissue. Samples were prepared according to the same procedures as with Example 1.

The following were included when scoring for Diagnostic Clarity: (i) Stain artifacts caused by HE600 staining process; (ii) Stain issues (e.g. poor differentiation, hue, incorrect staining); and (iii) Other issues that could reasonably be caused by the staining process that can affect time and effort required to make a diagnosis.

Diagnostic Clarity was scored on a scale of −3 to 3 in a manner similar to that described in Example 1.

Figure 5A:
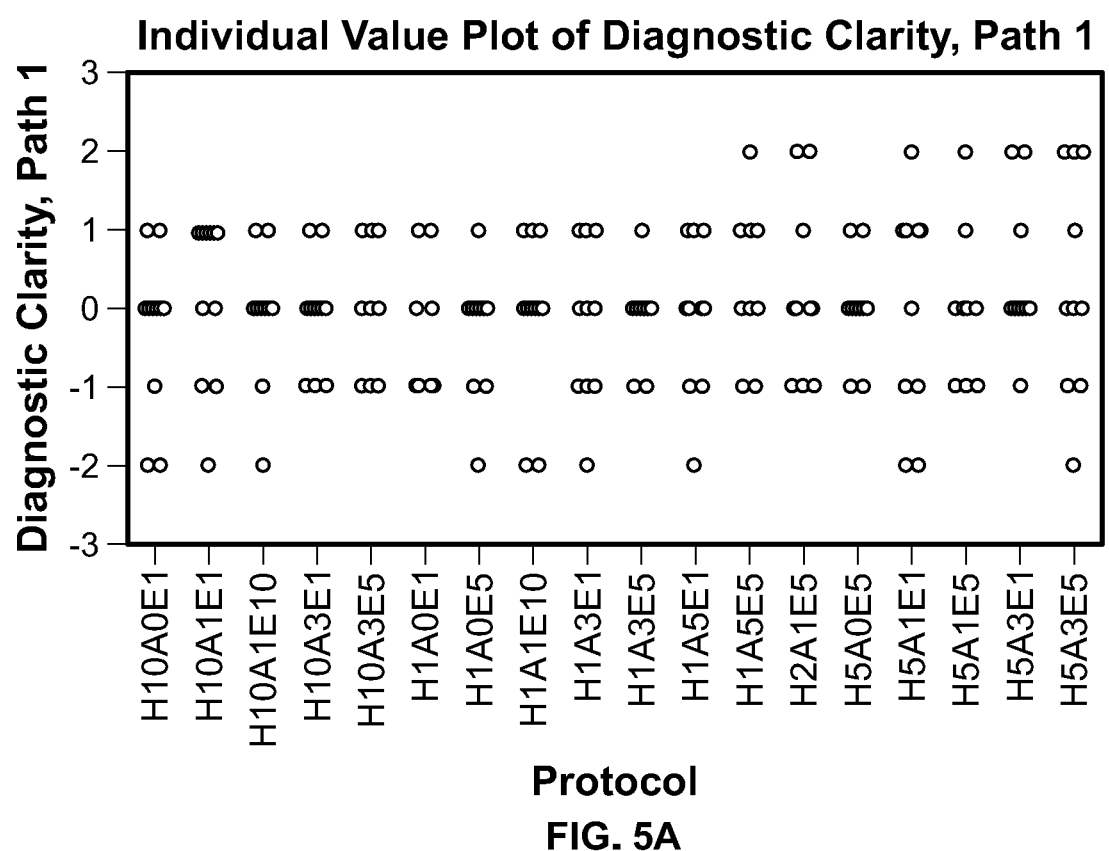
FIGS. 5A and 5B illustrate diagnostic clarity scores for each tissue type examined by a pathologist.
Figure 5B:
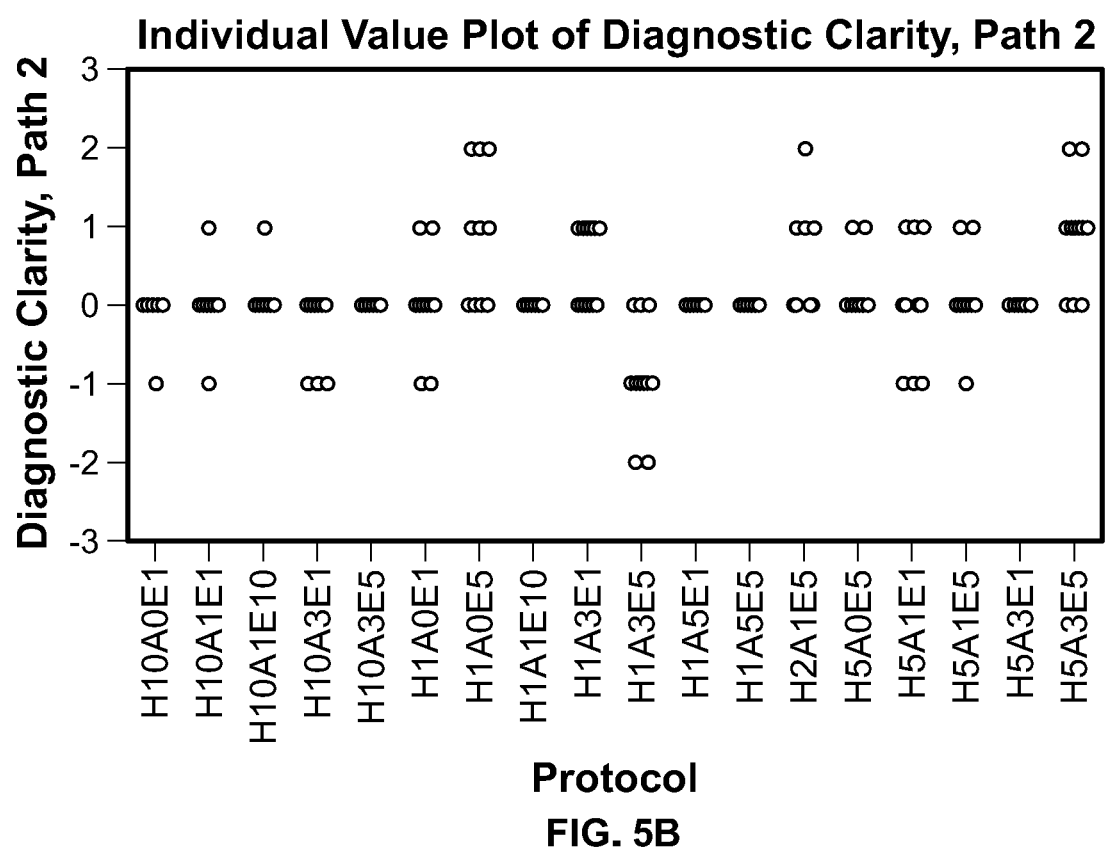

A slide pair consisted of Test and Control slides stained with the same staining protocol. Each slide in the pair was randomly labeled A or B; the slides were scored with slide B compared to slide A. Slides were scored for Diagnostic Clarity by two (2) pathologists. The results are shown in FIGS. 5A and 5B shown with the Test slide as Slide B. A score of 2 indicates that Diagnostic Clarity for the test is substantially easier to diagnose than the control. That is, a score of −2 indicates that Diagnostic Clarity for the test is substantially harder to diagnose than the control.

In FIG. 5A, twelve (12) Test slides received a score of −2, i.e. they were substantially harder to diagnose than the control slide upon initial inspection. 10/12 of these slides were skin with the comment "difficult to see solar elastosis." It is known that hematoxylin staining on solar elastosis is light on the HE600. With the Mitigation in place, the increase in eosin intensity masks the [lightly stained] solar elastosis to the point where it is a diagnostic concern.

As seen in FIG. 5B, for protocols H10A0E1, H10A1E1, H10A1E10, H1A0E5, H1A3E1, and H5A3E5, one of the pairs for each protocol was scored either 0 or −1 and the other a −2. This is likely due to slide-to-slide staining variability that is observed in the HE600. Determining root cause of this slide-to-slide staining variability is beyond the scope of the work in this document. For protocol H5A1E1, 1 pair received a score of 2 and the other −2. This again is likely due to the slide-to-slide staining variability that is observed in the HE600.

Figure 6:
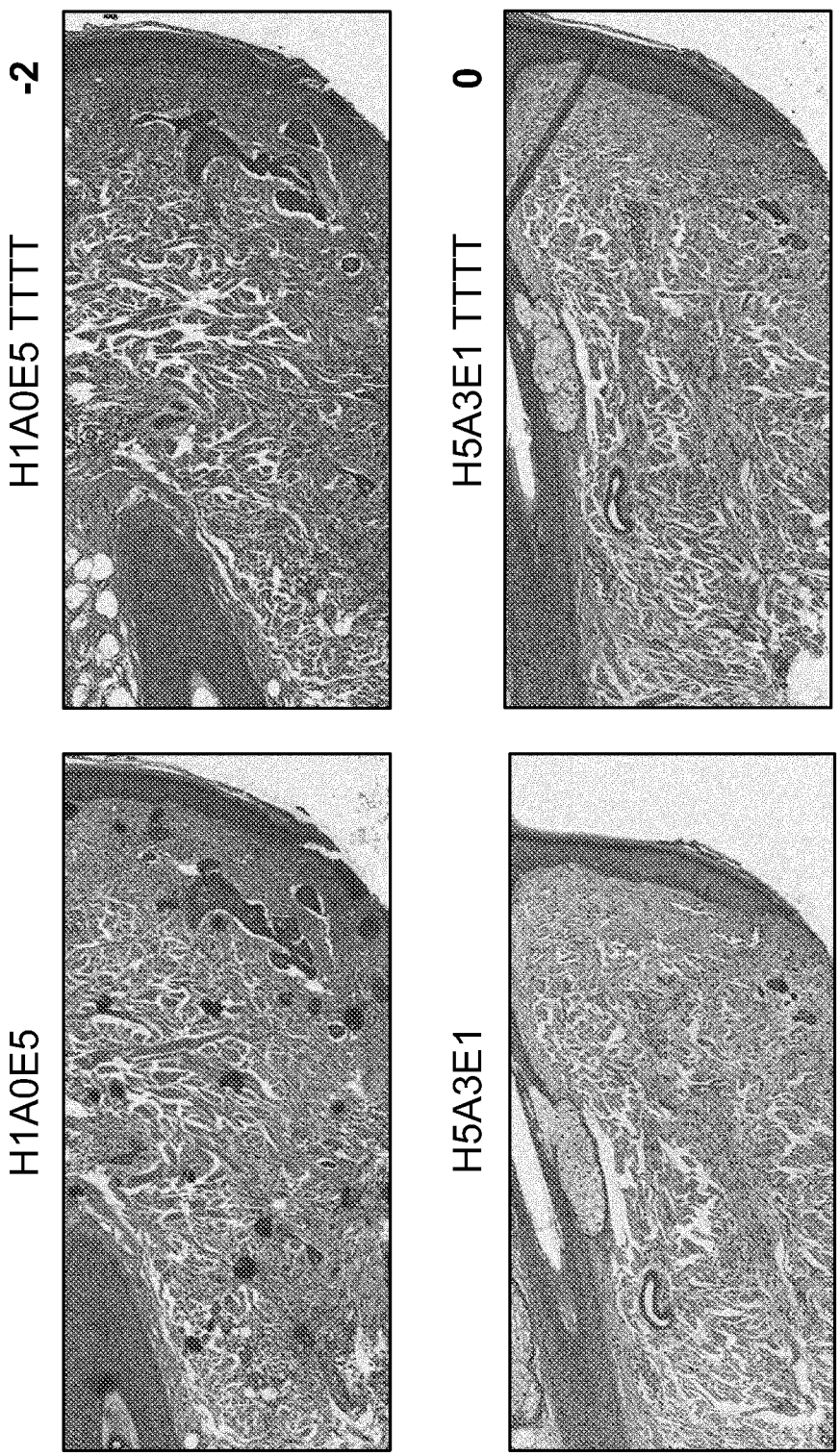
FIG. 6 sets forth skin samples stained with two different staining protocols. Images on the right-hand side of the image were stained with a mitigation technique were the samples were using a protocol where wash solution dispense steps were replaced with transfer solution dispense steps ("Mitigation #1"). H1A0E5 stained with the mitigation technique received a score of −2 when compared to the control. H5A3E1 stained with the mitigation technique received a score of 0 when compared to the control. Hematoxylin precipitate is observed in the H1A0E5 image with no mitigation but was deemed unrelated to the study.
Figure 7A:
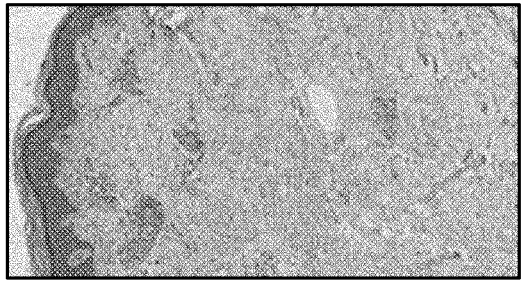
FIG. 7A provides representative examples of two staining protocols: (1) where an acid solution was dispensed a first time between hematoxylin staining and eosin staining and where the same acid solution was dispensed a second time immediately after eosin staining (left column of images); and (2) where no acid solution was dispensed between hematoxylin staining and eosin staining but where acid solution was dispensed immediately after eosin staining (no immediate wash step after eosin staining) (right column of images). This figure is a characterization of acid wash before and after eosin staining (HABEAWWWTTL dispensing steps) and replacing all post-eosin wash steps with acid solution (HABEAAATTL dispensing steps); where H=hematoxylin staining; A=application of an acid solution; B=application of an alkaline solution; E=application of an eosin stain; T=application of transfer solution; W=application of wash solution, and L=application of another fluid.
Figure 7A:
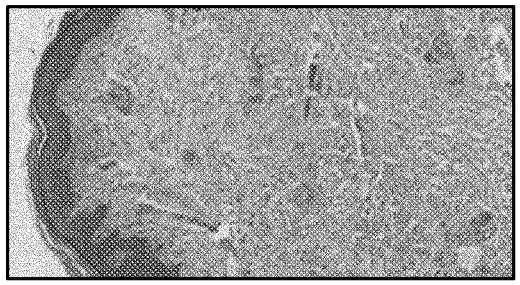
Figure 7A:
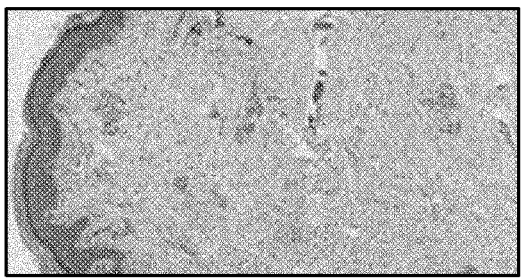
Figure 7A:
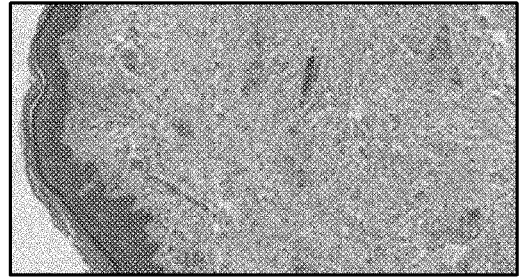
Figure 7A:
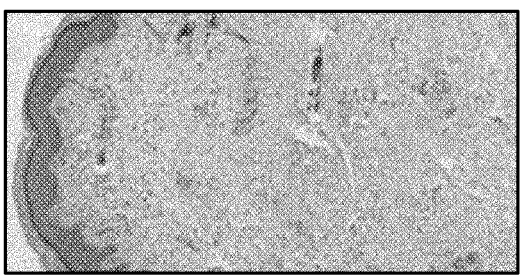
Figure 7A:
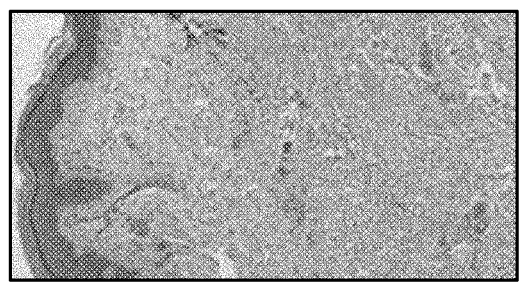
Figure 7A:
Figure 7A:
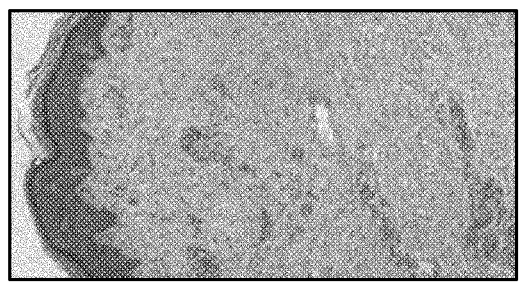
Figure 7:
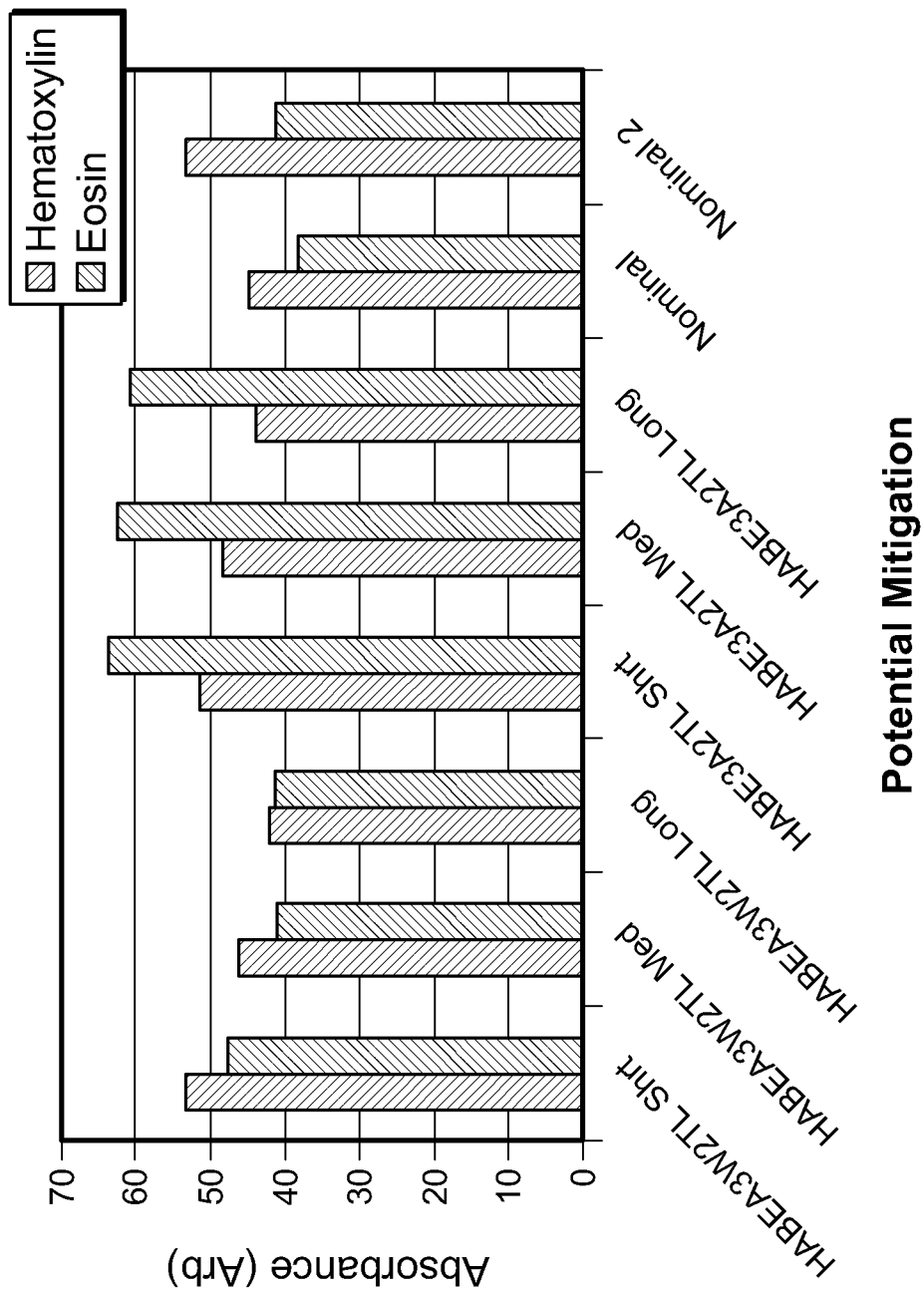
FIG. 7B sets forth a bar graph providing absorbance values for each of the staining protocol examples set forth in FIG. 7A.

Images of skin stained with protocols H1A0E5 and H5A3E1 with (images on the right with TTTT) and without the mitigation are shown in FIG. 6.

The Mitigation slide stained with H1A0E5 received a score of −2 even though blue dots were prevalent on the control slide; the solar elastosis is masked. By dialing down the eosin, it is possible to see the solar elastosis, as seen in the bottom 2 images of FIG. 6.

Ten slides received scores of 2 and were primarily breast and colon. These slides generally received a score of 2 due to the fact that the light eosin staining was easier to see. It should be noted that 20 tonsil slides received a score of −1, many with the comment "more difficult to see nuclear detail."

In FIG. 5A only two (2) Test slides received a score of −2. Pathologist 2 observed and commented on "blue spots on top of tissue" while scoring for Diagnostic Clarity. These blue spots randomly appeared on all tissue types. It should be noted that Pathologist 2 did comment that "solar elastosis much easier to see" on several of the skin pairs but did not affect Diagnostic Clarity for this pathologist. It is interesting to note that more spread is observed for each protocol in FIG. 5A (Pathologist 1) than FIG. 5B (Pathologist 2).

As seen in FIG. 6 it became easier to see solar elastosis with slides stained with Mitigation when the eosin is dialed to a lower setting.

This study was to examine any impact the improved eosin staining from replacing wash with transfer solution would have on diagnosis. As seen in the results, for most tissue types, the effect is very positive, however, on a small number of skin lesions, the brighter eosin may overwhelm hematoxylin staining, impeding diagnosis.

Example 3—Mucin Dialability

This mucin staining study was derived to determine the impact of the staining protocol mitigations on the HE 600's ability to remove mucin staining. After screening several colon cases for mucin staining, we selected four cases, and stained over a hundred total slides at various hematoxylin solution, acid solution, and eosin solution settings (HAE settings) (see Example 1) with matching H and E to pair up high A and low A slides to see if the mucin staining is dialable (see Table 4).

TABLE 4

Protocols and mitigations used for the mucin study

| HAE protocols run here: | Mitigations |
| --- | --- |
| H1A1E1 | nominal (EWWWTTL) |
| H1A5E1 | Transfer (ETTTTL) |
| H4A1E5 | Acid wash (HBEAWWWTTL) |
| H4A3E5 | N/A |
| H10A1E10 | N/A |
| H10A3E10 | N/A |

Figure 8A:
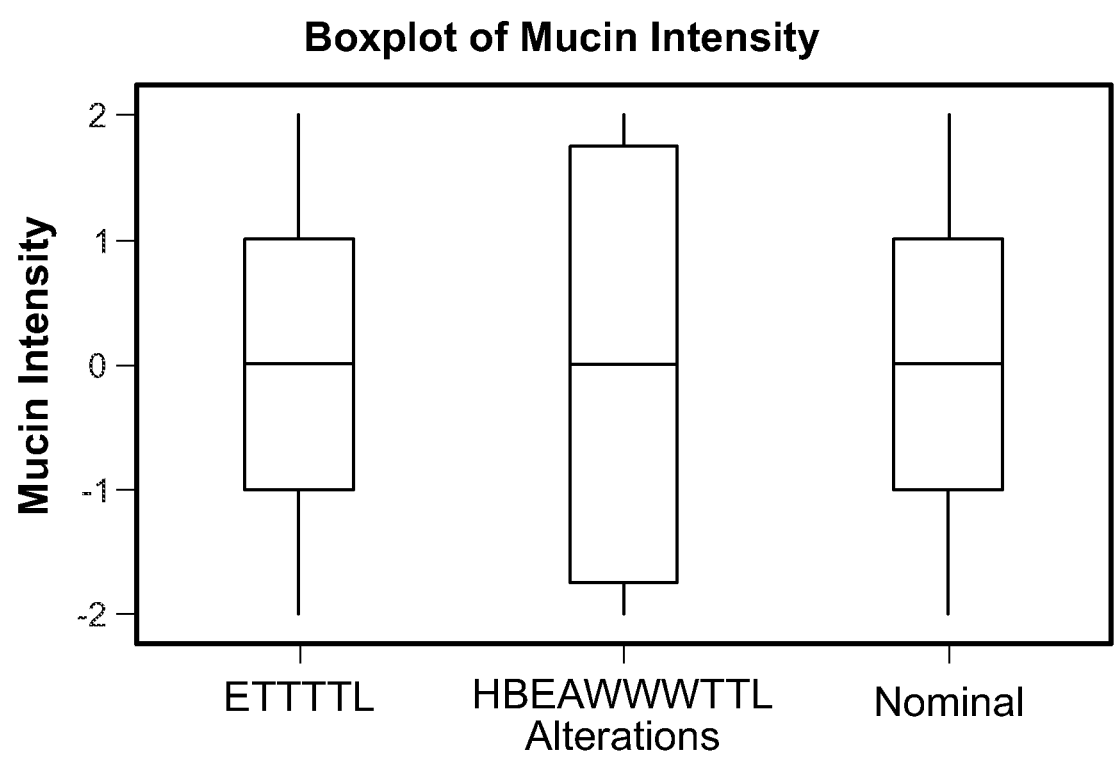
FIG. 8A illustrates pooled mucin intensities across hematoxylin solution, acid solution, and eosin solution settings, as described further herein.
Figure 8B:
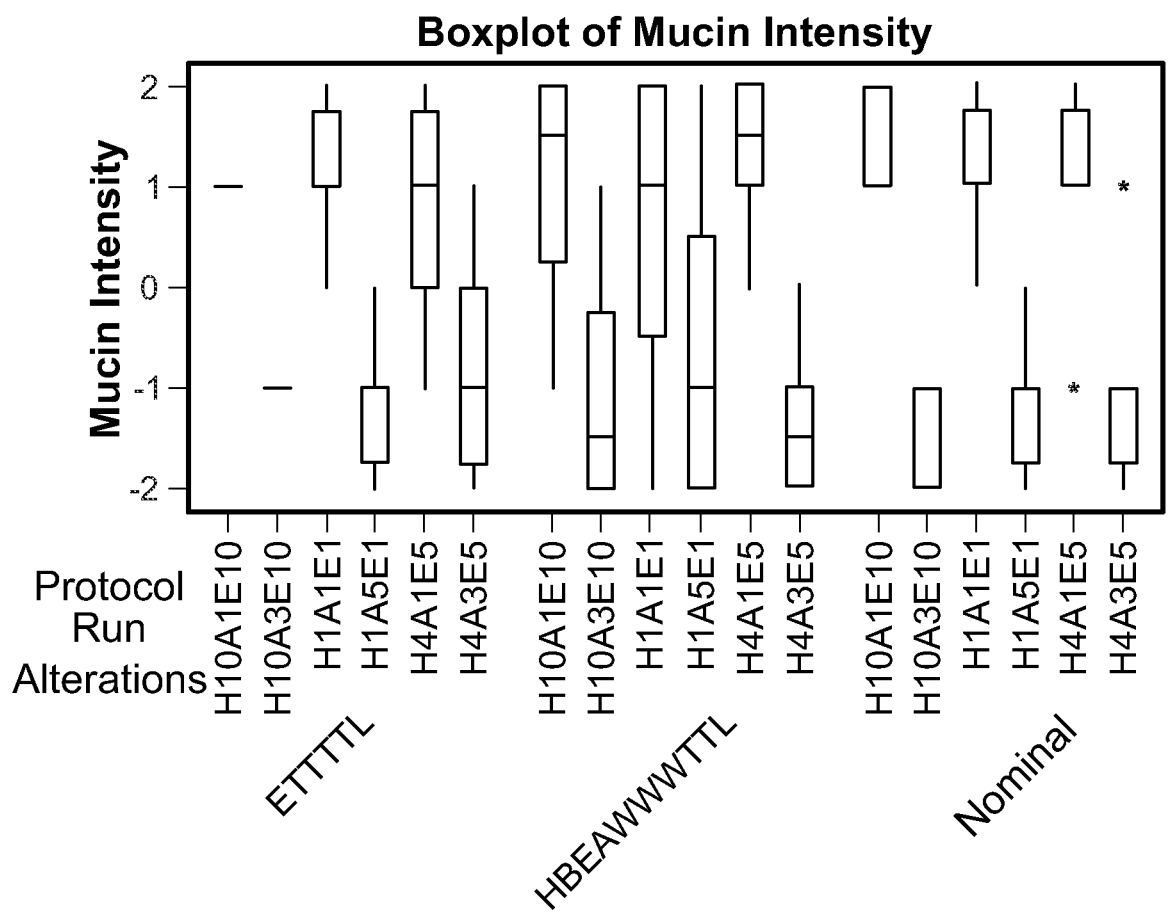
FIG. 8B illustrates mucin intensity by hematoxylin solution, acid solution, and eosin solution settings across various test techniques.

Slides run with the six protocols were paired up and scored with comparisons between H1A1E1-H1A5E1, H4A1E5-H4A3E5, and H10A1E10-H10A3E10. Results show that the transfer solution mitigation has minimal impact on mucin dialability compared to the nominal stain, with a slight increase in mucin staining variability. However, the acid wash move mitigation has a significant impact, leading to poorer mucin dialability and much more variability in mucin stain level. This can be seen by the fact that the boxplot of mucin intensity pooled across HAE settings is much larger for the acid wash move mitigation as seen in FIG. 8A. In addition, in FIG. 8B, one can see for individual HAE settings that the acid wash move shows much more overlap in mucin intensity between the high and low acid wash settings than either the nominal or the transfer solution mitigation.

In terms of mucin stain dialability, both mitigations show a negative effect, decreasing the ability to remove mucin. The transfer solution mitigation shows a very small effect, as we would not expect it to have any impact on hematoxylin staining. However, the acid wash move mitigation shows a major impact on mucin removal, which is to be expected as moving the acid wash to after eosin seriously impacts its ability to remove hematoxylin. The bluing treatment has by then already occurred, rendering the hematoxylin insoluble and much more difficult to remove.

Mucin stain "dialability" is not impacted by the transfer solution mitigation but is strongly reduced by the acid wash mitigation.

Example 4—Non-Inferiority of the Mitigations Vs Nominal Stain

Figure 3:
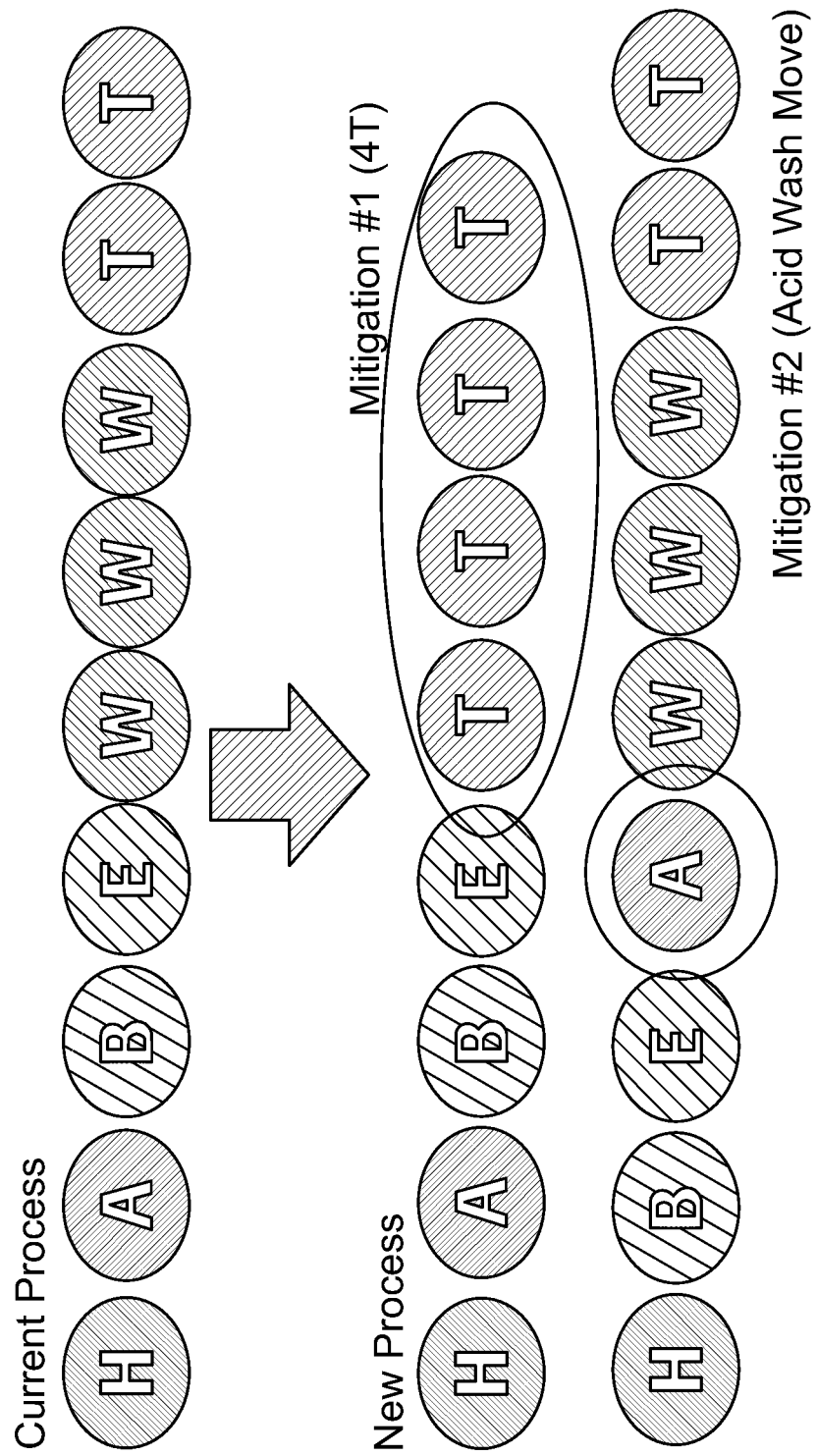
FIG. 3 comparatively illustrates the dispense steps in a standard H&E staining protocol (top); those dispense steps in a modified protocol where the dispensing of wash solution is replaced on a three-for-two basis with transfer solution (middle, "mitigation #1"); and those dispense steps in a modified protocol where the dispensing of an acid solution is moved from immediately after a hematoxylin staining solution dispense to immediately after an eosin staining solution dispense (bottom, "mitigation #2"); where H represents the dispensing of a hematoxylin staining solution; A represents the dispensing of an acid solution; B represents the dispensing of an alkaline solution; E represents the dispensing of an eosin staining solution; W represents the dispensing of a wash solution; T represents the dispensing of a transfer solution; and O represents an organic fluid solution.
Figure 4A:
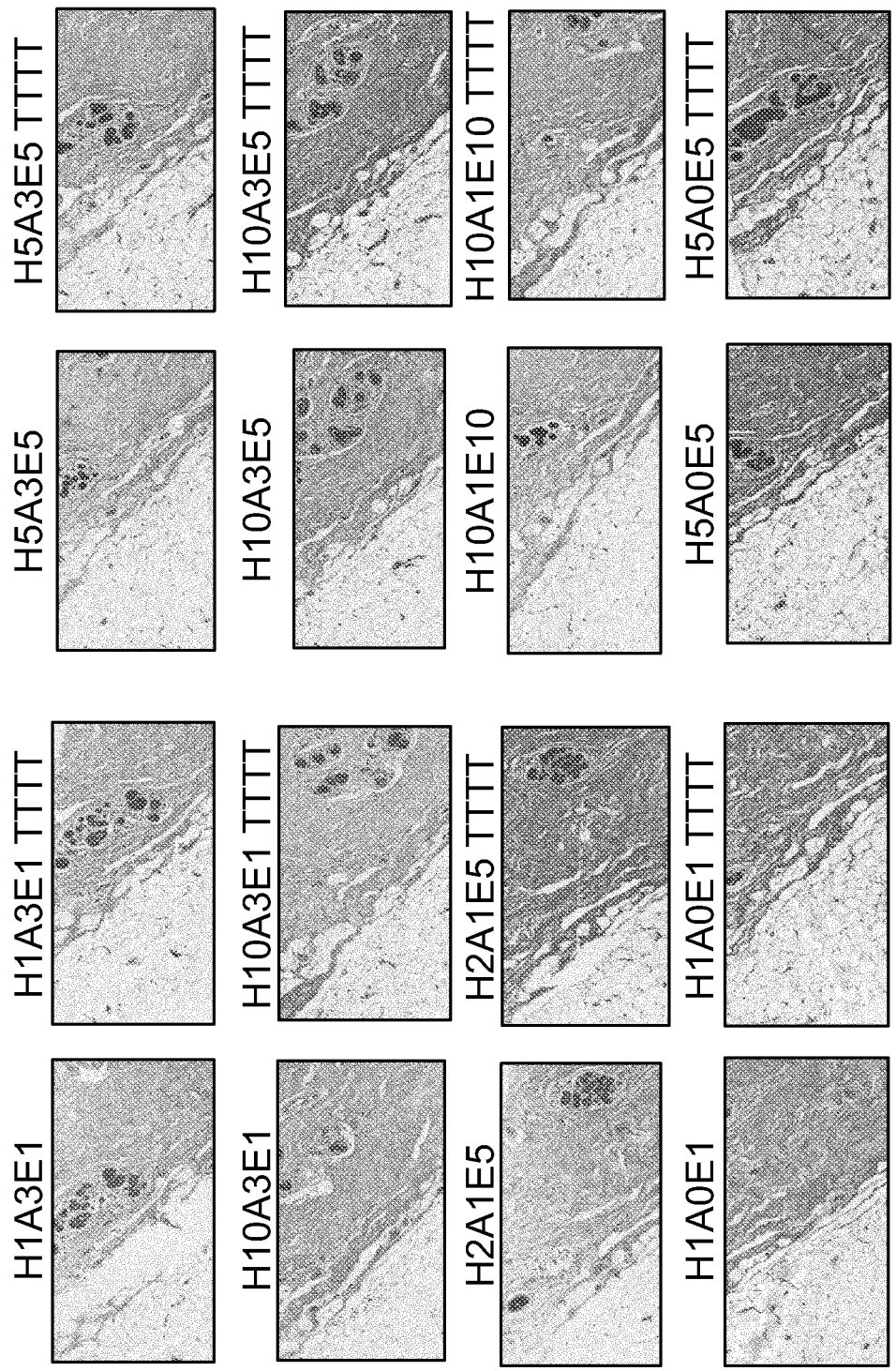
FIG. 4A sets forth control and test images of breast tissue, whereby the control slides were stained using a standard staining protocol, and where the test images were stained using a protocol where wash solution dispense steps were replaced with transfer solution dispense steps ("Mitigation #1").
Figure 4B:
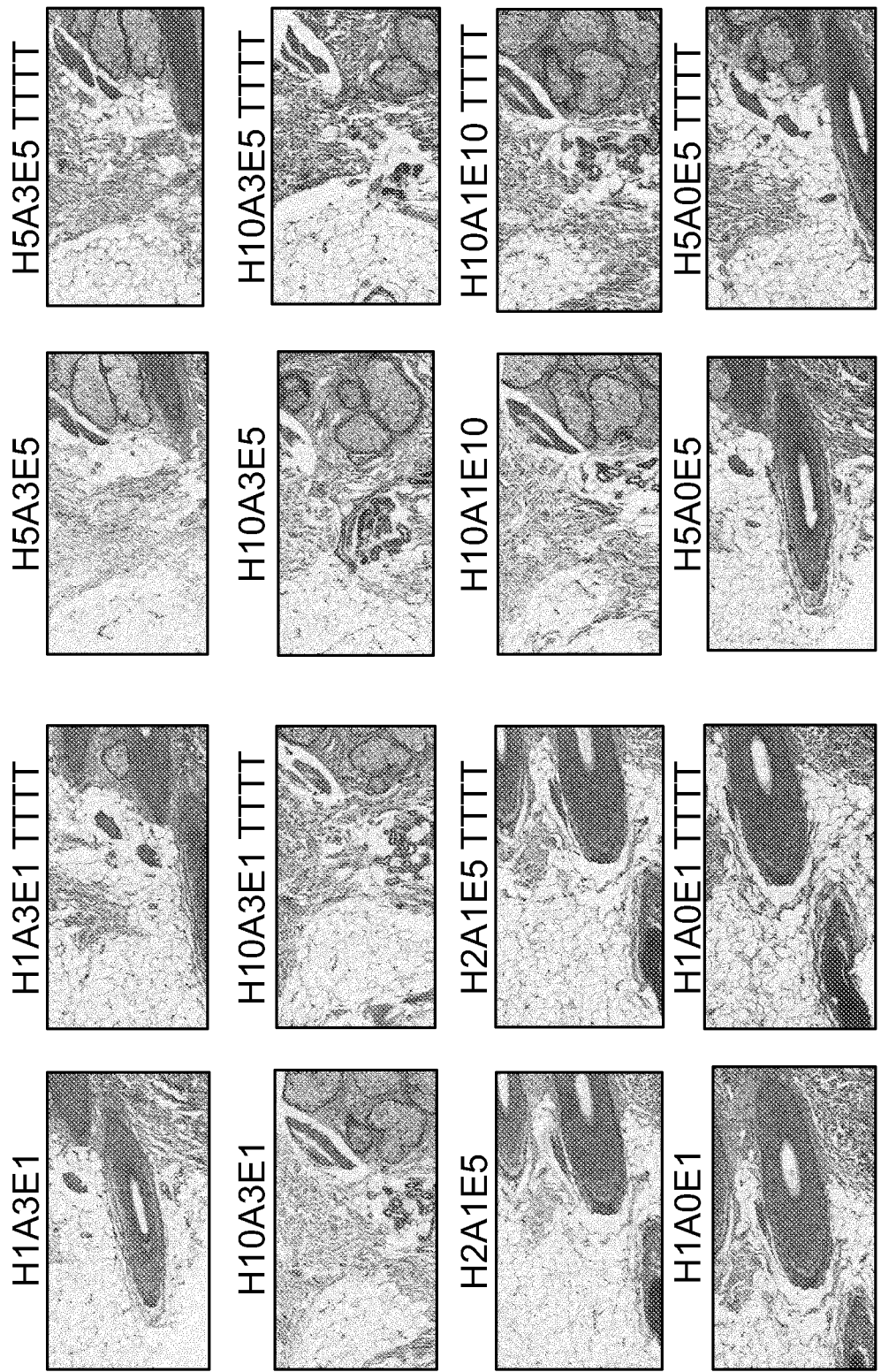
FIG. 4B sets forth control and test images of skin tissue, whereby the control slides were stained using a standard staining protocol, and where the test images were stained using a protocol where wash solution dispense steps were replaced with transfer solution dispense steps ("Mitigation #1").
Figure 4C:
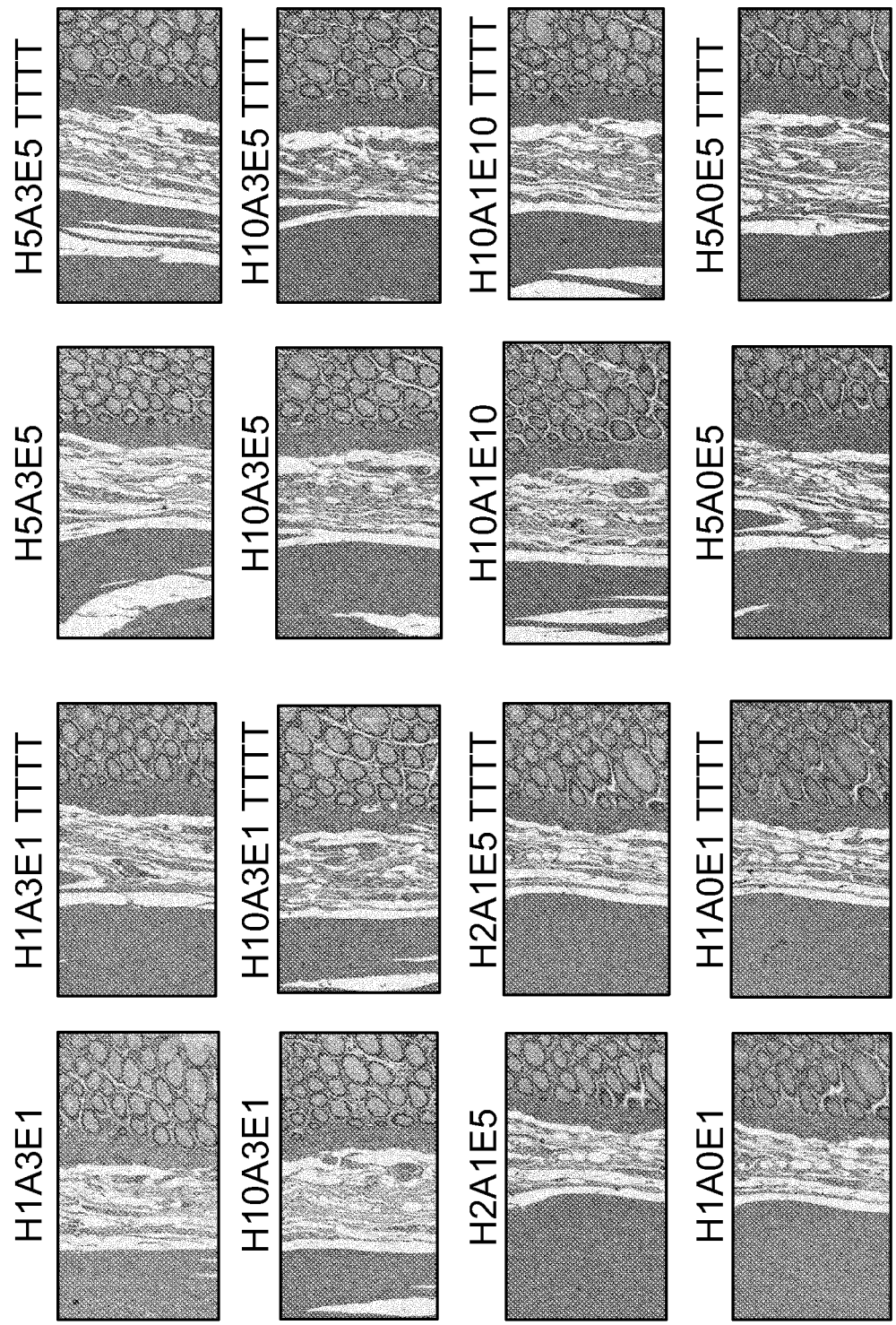
FIG. 4C sets forth control and test images of colon tissue, whereby the control slides were stained using a standard staining protocol, and where the test images were stained using a protocol where wash solution dispense steps were replaced with transfer solution dispense steps ("Mitigation #1").
Figure 9A:
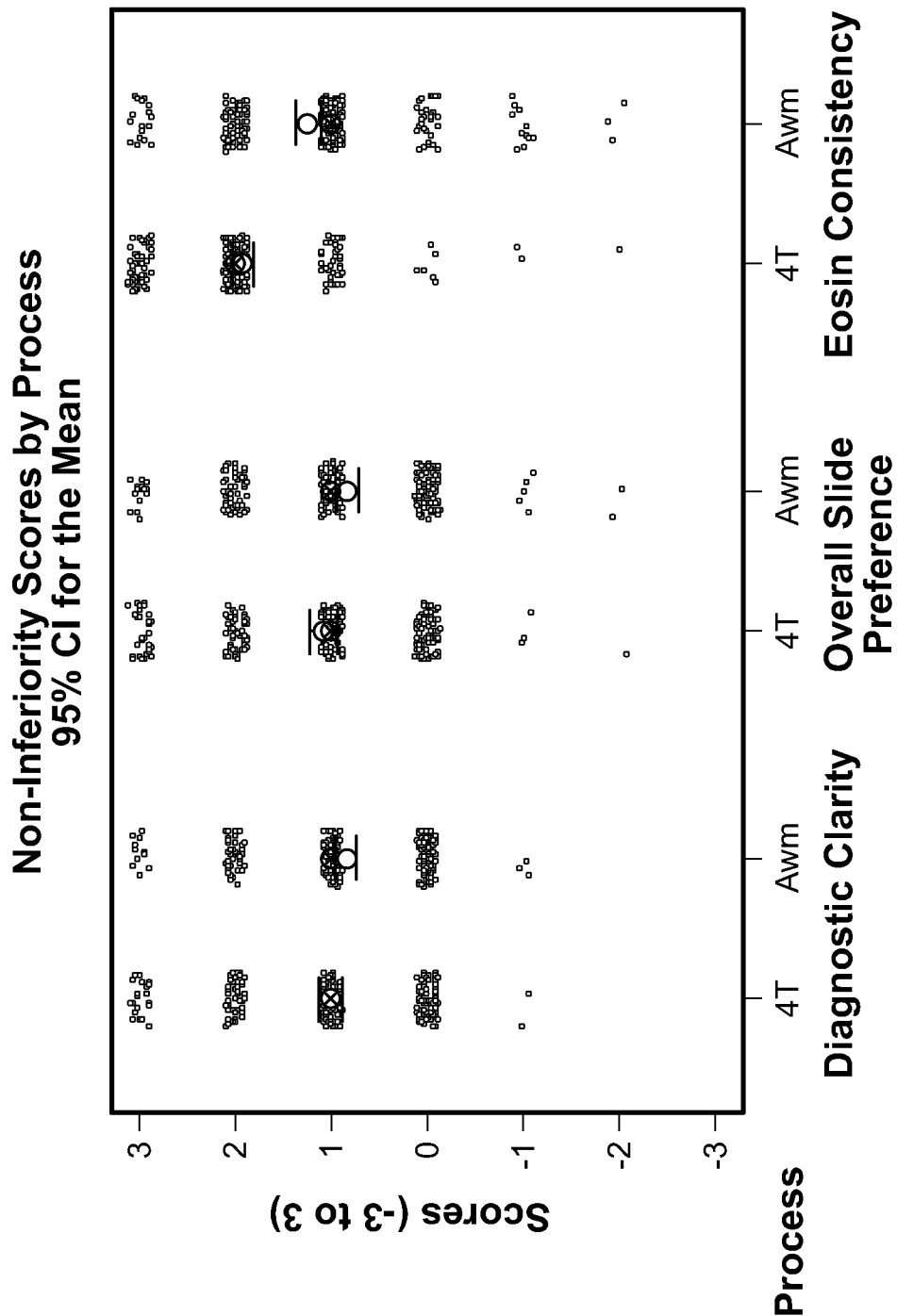
FIG. 9A demonstrates the scores of each of the mitigations when compared to an equivalent nominal stain (using the same "HAE settings"). Higher scores are better, with scoring categories: diagnostic clarity-how easy is a slide to read for diagnosis, slide preference-would you as a pathologist prefer this stain for diagnosis, and eosin consistency-does the counter-stain stain appropriately and evenly across the tissue.

Both mitigations illustrated in FIG. 3 demonstrate general non-inferiority across the tissues used, with both Mitigation #1 and Mitigation #2 improving diagnostic clarity, eosin stain consistency, and preference scores over the current nominal stain on the tissues used (all scores here are based on a comparison between a mitigation slide and a current stain nominal slide). Both the Mitigation #1 and Mitigation #2 showed significant improvements over the nominal stains, as can be seen in FIG. 9A where the mean was significantly different from zero in every measurement (as per the 95% confidence intervals). Mitigation #1 showed greater improvements than Mitigation #2 in consistency ($p<0.001$, two sample t-test Minitab) and overall preference ($p=0.009$, two sample t-test Minitab), with diagnostic clarity showing similar results between Mitigation #2 and Mitigation #1 ($p<0.058$ in a difference test, two sample t-test Minitab). In addition, if one considers a −2 or −3 score a failure, 100% of both mitigations passed Diagnostic Clarity, <1% of both mitigations failed Overall Preference, and 1.25% of Mitigation #2 and <0.5% of Mitigation #1 failing Eosin Consistency.

Figure 9B:
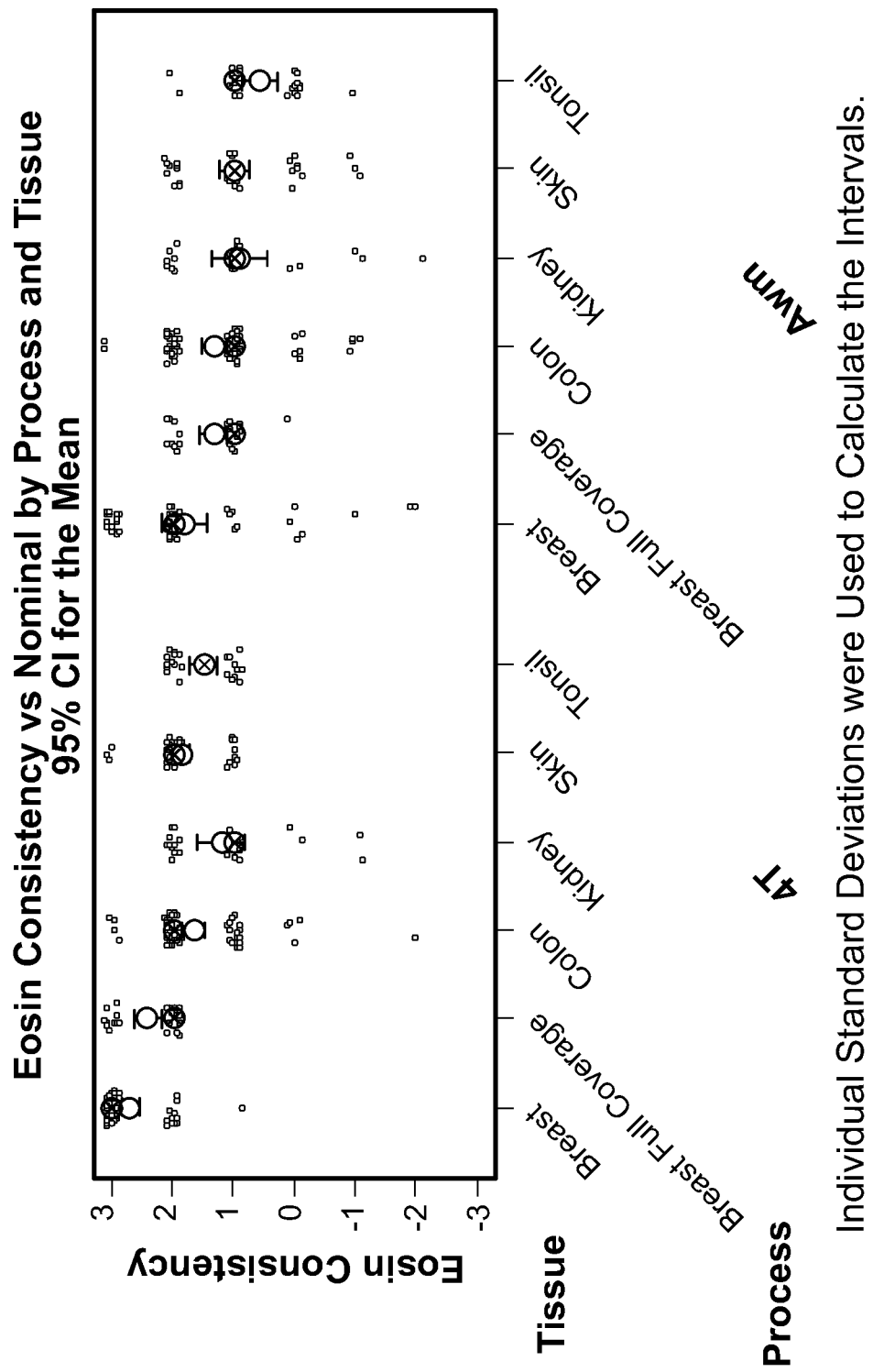
FIG. 9B breaks down the eosin consistency scores from 9A by mitigation and tissue, demonstrating improvement across all tissues for all both mitigations.

When we split the non-inferiority scores out by tissue type as seen in FIG. 9B, we see the greatest improvements over nominal in breast tissue, followed by colon and skin, unsurprising as these three tissue types were the main areas of complaint in light eosin staining. Tonsil and kidney also show improvements however.

Figure 9C:
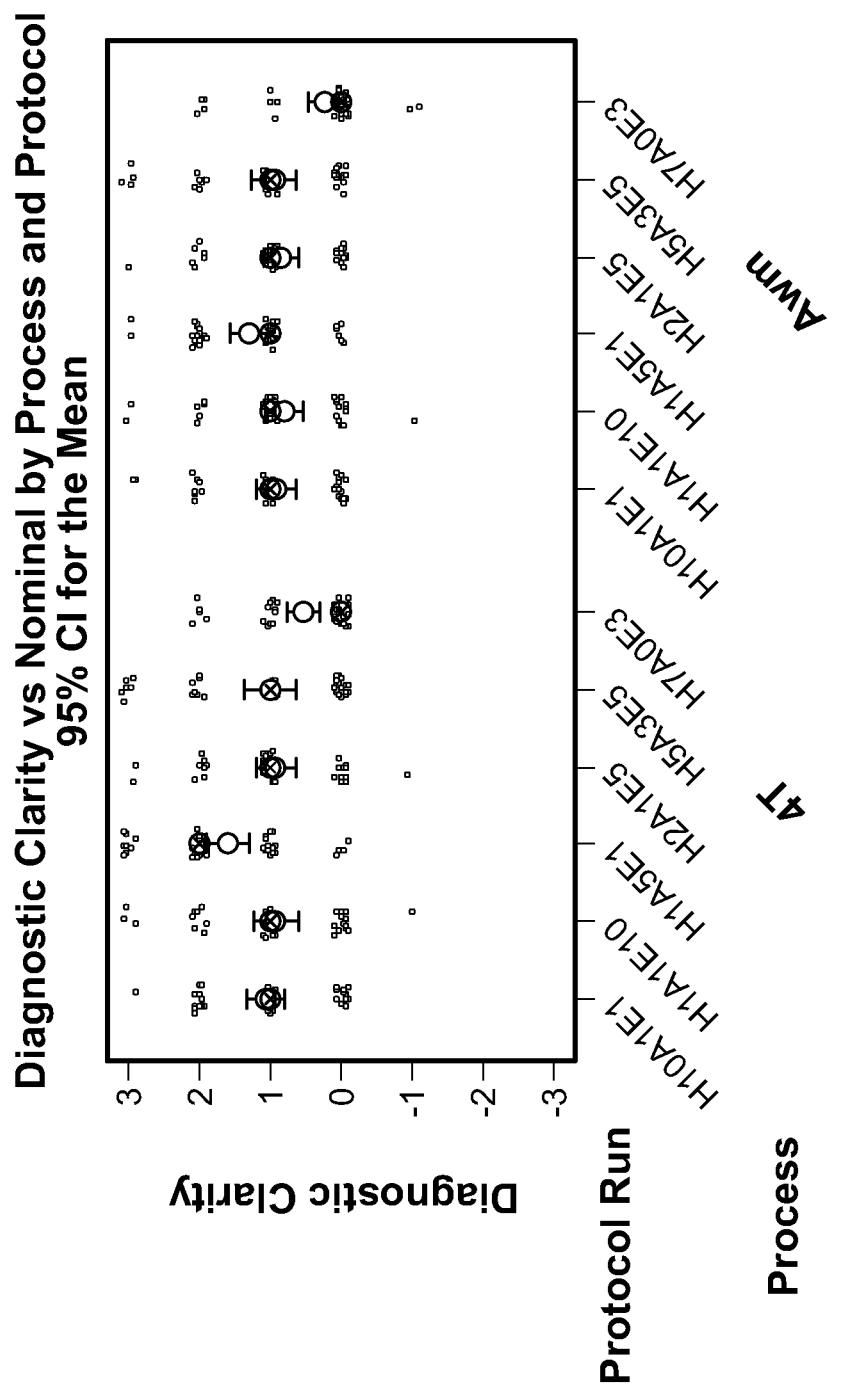
FIG. 9C breaks down the diagnostic clarity scores by mitigation and protocol, demonstrating improvements across protocols.

When we separate out both mitigations by protocol run as seen in FIG. 9C the only obvious trend is that H1A5E1 (the Hematoxylin, Acid wash, and Eosin settings) protocol tended to perform better and H7A0E3 performed worse. It is unclear why this would occur, other than at A0, Mitigation #2 should have no improvement over nominal (A0 means no acid wash is applied, so the nominal and Mitigation #2 stains should be the same). Why this impacts Mitigation #1 is unclear. As to why H1A5E1 performs better, possibly the longer acid wash improves the Mitigation #2 (longer post-eosin acid wash incubation could improve eosin retention, or perhaps improve eosin differentiation). For Mitigation #1, it is unclear, unless the lighter eosin setting offsets the eosin intensity increase caused by the mitigation. Quite possibly these differences are simply noise.

This study showed the overall stain improvement for both mitigations across a variety of tissue types. It also revealed trends across tissue and protocol types, some expected, others unexpected, but independent of these trends, across all protocols and tissues tested here, the mitigations outperform the current nominal stain.

Four types of reproducibility were looked at in this study: reproducibility within a new staining process (Mitigation #1-Mitigation #1, Mitigation #2-Mitigation #2, and New Script Nominal-New Script Nominal) and reproducibility between the New Script Nominal (NSN) and Old Script Nominal (OSN). This was to ensure that the new staining processes were as reproducible as the current nominal staining process (OSN), and that the NSN and OSN stains were the same. Mitigation #1 and Mitigation #2 are illustrated in FIG. 3.

Example 5-Reproducibility

Stain reproducibility here was measured in such a way as to maximize the possible variability in the stain environment. Slide comparisons were always between slides stained on different instruments, different trays, and different slide positions in the tray. Nearby tissue sections, within ten cuts of each other, were used to reduce tissue variation's effects. Stain similarity is scored on a 0-3 scale, with higher numbers meaning less similar. If we consider 0 and 1 to be passing scores, the concordance levels for each mitigation were: Mitigation #1 62%, Mitigation #2 50%, NSN 46%, and NSN vs OSN 55%, as seen in Table 5.

TABLE 5

Reproducibility Concordance Rates, Bounds, and Counts.

| Comparison | # Concordant (0 or 1 similarity) | # samples (# pairs × # reads) | Concordance % | Lower Bound % | Higher Bound % | # slide pairs |
|---|---|---|---|---|---|---|
| 4T4T | 75 | 120 | 62.50 | 53.2 | 71.17 | 60 |
| Mitigation #2-Mitigation #2 | 60 | 120 | 50.00 | 40.74 | 59.29 | 60 |
| NSNNSN | 56 | 120 | 46.67 | 37.5 | 55.99 | 60 |
| NSNOSN | 133 | 240 | 55.42 | 48.89 | 61.81 | 120 |

Figure 10A:
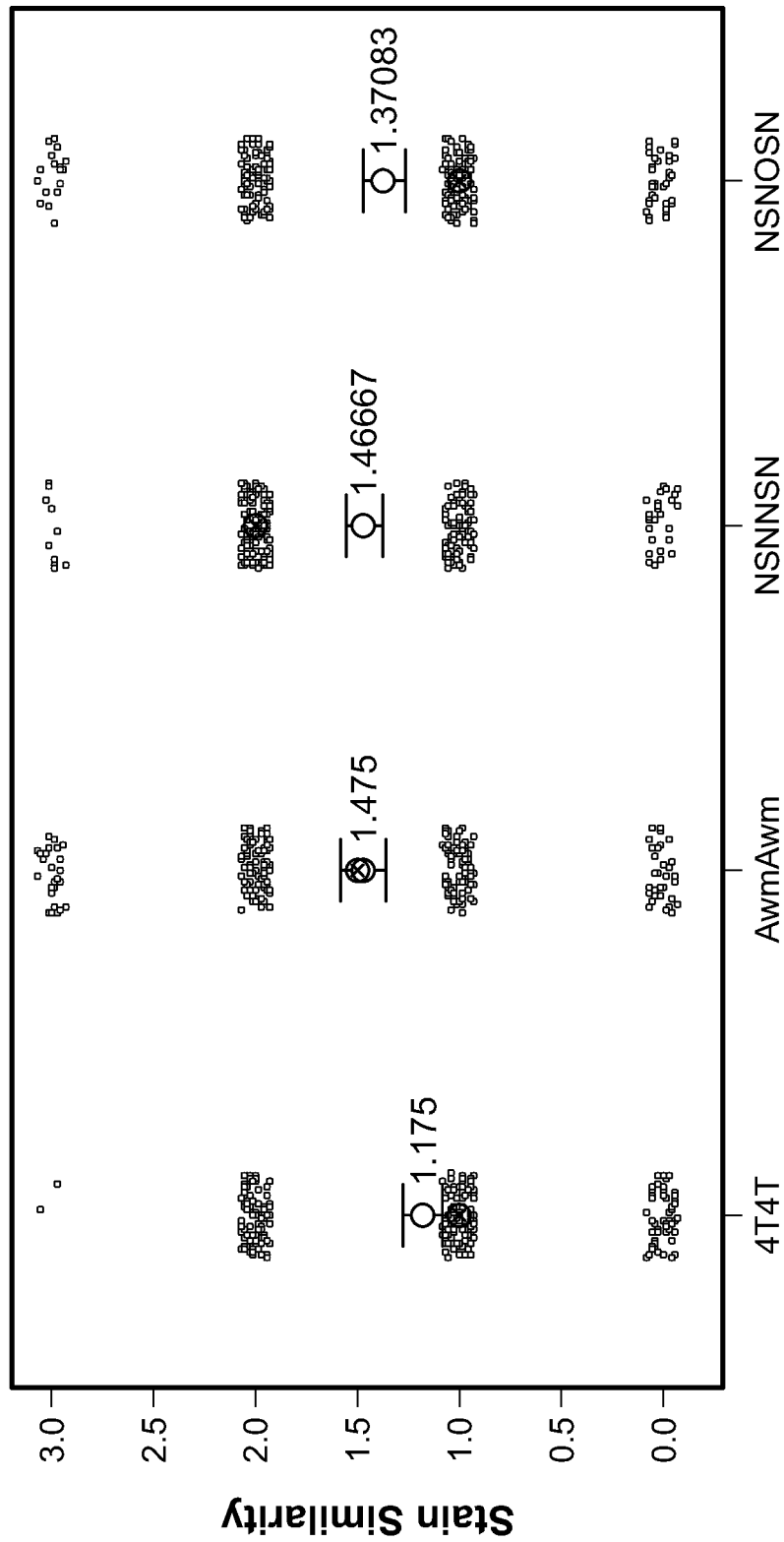
FIG. 10A is a comparison of the mitigations reproducibility or stain-to-stain similarity. Every score is a comparison between two slides of the same tissue, nearby cuts, that are stained with the same process and protocol. Scores range from 0, which indicates the pair looks the same, to 4, which indicates the pair looks completely different. Here we see that the 4T mitigation shows a strong increase in reproducibility compared to the nominal stain (NSN or OSN).
Figure 10B:
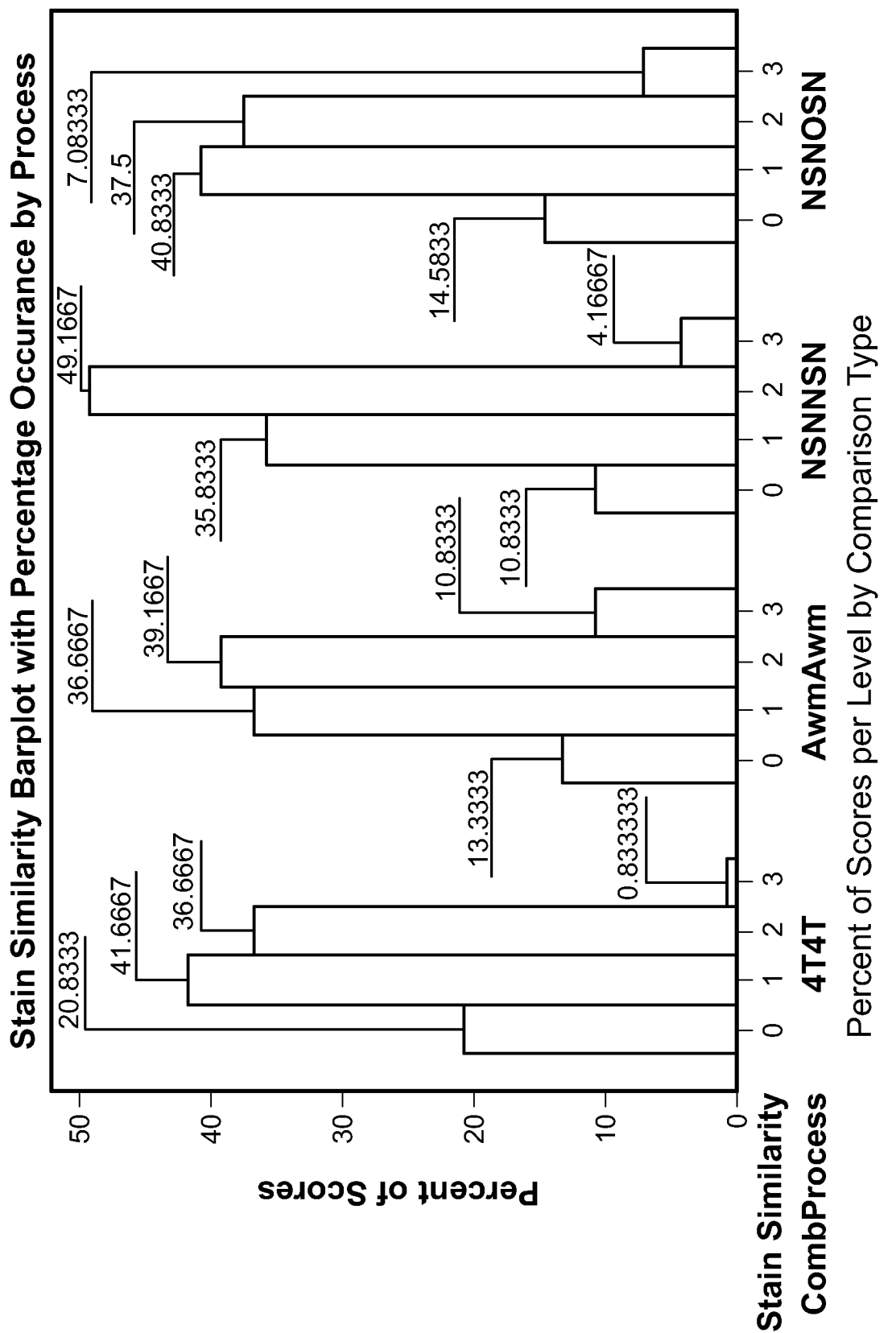
FIG. 10B is a different method of visualizing the same data as in 10A, showing a histogram of the distribution of data for each of the staining processes.

Looking at the distributions in FIGS. 10A and 10B, Mitigation #1 improves reproducibility by strongly reducing the number of stain comparisons judged to be a 3 (markedly different) and increasing the number rated 0 (the same). Running a Tukey Method comparison in Minitab reveals that the Mitigation #1 stains are significantly more reproducible than the other stains, with reproducibility levels being significantly different between Mitigation #1 and all other staining processes. The other staining processes did not show any significant differences in stain similarity. The Tukey Method comparison is essentially a t-test corrected for multiple comparisons, making it more suitable for a multiple comparison set than individual t-tests (it lowers the type I error rate).

In terms of reproducibility, Mitigation #1 significantly improves slide to slide reproducibility, due to improvements in eosin stain reproducibility slide-to-slide. Mitigation #2 similarly improves eosin stain reproducibility slide-to-slide, but this improvement is offset by a decrease in hematoxylin slide-to-slide reproducibility.

This study was to demonstrate the mitigations had not impact stain reproducibility, and that was demonstrated here. In fact, upon analysis, transfer solution replacement of wash substantially improves reproducibility (in particular, eosin stain reproducibility), while the acid wash move has an overall neutral impact (increases eosin reproducibility while decreasing hematoxylin reproducibility).

Additional Embodiments

In some embodiments, the staining system comprises components in addition to those described herein. Additional embodiments, features, systems, devices, materials, methods, and techniques which may be incorporated into the present systems and methods are described in U.S. Pat. Nos. 8,911,815; 9,498,791; 9,618,430; 7,468,161; and 6,352,861, the disclosures of which are hereby incorporated by reference herein in their entireties. Yet additional components of staining systems are described in U.S. Pat. Nos. 7,303,725, 8,048,373, 9,528,918, and 9,192,935 the disclosures of which are hereby incorporated by reference in their entireties.

In some embodiments, the staining system includes bulk fluid containers (e.g. to hold any of the solutions described herein prior to dispensing or applying to a sample). In some embodiments, slide processing apparatus, in some embodiments, further comprises a plurality of additional staining modules and a controller configured to independently control each of the staining modules.

In some embodiments, the staining system may include a frame supporting a stack of workstations comprising, for example, one or more drying or baking stations or modules, de-waxing or de-paraffinizing station or module, one or more staining stations or modules and a coverslipping station or module arranged in a tower. In some embodiments, a transport and elevator mechanism is provided adjacent to the tower for transporting a slide tray designed to carry a plurality of individual specimen bearing slides from a tray storage station through drying/baking, de-waxing, staining and coverslipping operations.

In some embodiments, a tray storage garage or station comprises a pair of stanchions bearing a plurality of vertically spaced shelves or skids for accommodating slide trays. In some embodiments, the storage station or garage includes a pivotally mounted door providing access to a first shelf position (for clarity, the outside skin or cover to garage has been omitted). A tray drive assembly indicated generally at including a pair of rotatably mounted drive wheels driven by a drive motor and transmission is positioned under the first shelf position for moving a tray into and out of the portal.

In some embodiments, the slide tray comprises a pan or slide tray having a generally rectangular plan, including a bottom wall, opposed side walls and opposed end walls. The slide tray typically is formed by conventional injection molding using synthetic polymers intended for such use, which are well-known in the art.

In some embodiments, the tray includes a specimen slide supporting rack for holding specimen slides in a substantially horizontal position in the same plane. Holding all the slides in the same plane facilitates baking and drying, as will be described below, and also prevents cross-contamination of slides during de-paraffinizing and staining as will be described below. In some embodiments, the rack includes a plurality of slide spring supports that limit the axial, lateral and vertical movement of specimen slides once placed on the slide tray. In some embodiments, the rack is supported above tray bottom at sufficient height to discourage or prevent the formation of films or bubbles forming between the specimen slide bottom and the tray bottom. In some embodiments, the slide spring supports hold the individual specimen slides in position by exerting force on opposing edges of the specimen slides. The floor of the slide tray is sloped towards the middle to facilitate drainage to a central location for evacuation of de-waxing fluids and stains, as will be described in detail hereinafter. In some embodiments, the tray permits the automated handling of a plurality of specimen slides through the steps of drying/baking, de-paraffinizing, staining and coverslipping. In some embodiments, the tray includes splash rails and is arranged to accommodate 16 specimen slides arranged in a generally horizontal grid two slides wide and eight slides tall.

The staining module can include at least one heating element positioned to conductively heat the first sidewall, the second sidewall, or both. The slide holder can be used to heat the slide, specimen, and/or liquid while the band of liquid is manipulated across the specimen.

The controller, in some embodiments, includes one or more memories and a programmable processor. The memory stores a first sequence of program instructions and a second sequence of program instructions. The programmable processor is configured to execute the first sequence of program instructions in order to process a specimen on the slide with a first liquid and configured to execute the second sequence of program instructions to process the specimen with a second liquid that is different from the first liquid. In some embodiments, the programmable processor is configured to execute the first sequence of program instructions in order to heat the slide and the controller is configured to execute the second sequence of program instructions in order to heat the slide to a second temperature, the second temperature is different from the first temperature.

The controller, in some embodiments, is configured to execute a first sequence of program instructions to command the dispensing device to deliver a first liquid to the slide at a first rate. The controller is further configured to execute a second sequence of program instructions to command the dispensing device to deliver a second liquid to the slide at a second rate that is different from the first rate.

At least some of the embodiments of the present disclosure relate to computer systems or computers integrated into a systems' controller or control system. A digital pathology system may comprise an imaging apparatus (e.g. an apparatus having means for scanning a specimen-bearing microscope slide) and a computer, whereby the imaging apparatus and computer may be communicatively coupled together (e.g. directly, or indirectly over a network). The computer system can include a desktop computer, a laptop computer, a tablet, or the like, digital electronic circuitry, firmware, hardware, memory, a computer storage medium, a computer program or set of instructions (e.g. where the program is stored within the memory or storage medium), one or more processors (including a programmed processor), and any other hardware, software, or firmware modules or combinations thereof (such as described further herein). For example, the computing system may comprise a computer with a display device and an enclosure.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI system may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

ADDITIONAL EMBODIMENTS

Additional Embodiment 1. A method of staining a specimen disposed on a substrate with an automated specimen processing apparatus, the method comprising:
(a) dispensing a predetermined amount of a hematoxylin solution to the specimen;
(b) at least partially removing the hematoxylin solution from the specimen;
(c) dispensing a predetermined amount of an alkaline solution to the specimen;
(d) at least partially removing the alkaline solution from the specimen;
(e) dispensing a predetermined amount of at least one additional solution to the specimen;
(f) at least partially removing the at least one additional solution from the specimen;
(g) dispensing a predetermined amount of an eosin staining solution to the specimen;
(h) at least partially removing the eosin solution from the specimen; and
(i) dispensing a predetermined amount of an acid solution to the specimen.

Additional Embodiment 2. The method of additional embodiment 1, wherein no acid solution is dispensed prior to eosin staining.

Additional Embodiment 3. The method of additional embodiment 1, wherein the method further comprises dispensing an acid solution to the specimen after hematoxylin staining but prior to eosin staining.

Additional Embodiment 4. The method of any of the preceding additional embodiments, wherein the at least one additional solution is selected from the group consisting of a wash solution, or a transfer solution.

Additional Embodiment 5. The method of additional embodiment 1 or additional embodiment 3, wherein the at least one additional solution is an acid solution.

Additional Embodiment 6. The method of additional embodiment 4, wherein the at least one additional solution is a wash solution.

Additional Embodiment 7. The method of additional embodiment 6, wherein the dispensing of the at least one additional solution to the specimen comprises (i) dispensing a wash solution; (ii) at least partially removing the wash solution; (iii) dispensing an acid solution; and (iv) at least partially removing the acid solution.

Additional Embodiment 8. The method of any of the preceding additional embodiments, further comprising dispensing a wash solution after the at least partial removal of the hematoxylin solution from the specimen and prior to the dispensing of the alkaline solution.

Additional Embodiment 9. The method of any of the preceding additional embodiments, further comprising (i) dispensing an acid solution after the at least partial removal of the hematoxylin solution from the specimen and prior to the dispensing of the alkaline solution; (ii) at least partially removing the acid solution from the specimen; and (iii) dispensing a wash solution to the specimen prior to dispensing the alkaline solution.

Additional Embodiment 10. A biological sample stained according to the method as in any of additional embodiments 1 to 9.

Additional Embodiment 11. A method of staining a specimen disposed on a substrate with an automated specimen processing apparatus, the method consisting essentially of:
(a) dispensing a predetermined amount of a wash solution to the specimen;
(b) at least partially removing the wash solution from the specimen;
(c) dispensing a predetermined amount of an eosin staining solution to the specimen;
(d) at least partially removing the eosin solution from the specimen;
(e) dispensing a predetermined amount of an acid solution to the specimen;
(f) at least partially removing the acid solution; and
(g) dispensing a wash solution to the specimen.

Additional Embodiment 12. A method of staining a specimen disposed on a substrate with an automated specimen processing apparatus, the method consisting of:
(a) dispensing a predetermined amount of a wash solution to the specimen;
(b) at least partially removing the wash solution from the specimen;
(c) dispensing a predetermined amount of an eosin staining solution to the specimen;
(d) at least partially removing the eosin solution from the specimen;
(e) dispensing a predetermined amount of an acid solution to the specimen;
(f) at least partially removing the acid solution; and
(g) dispensing a wash solution to the specimen.

Additional Embodiment 13. A biological sample stained according to the method as in any of additional embodiments 11 to 12.

Additional Embodiment 14. A method of staining a specimen disposed on a substrate with an automated specimen processing apparatus, the method comprising:
(a) dispensing a predetermined amount of an eosin staining solution to the specimen;
(b) at least partially removing the eosin solution from the specimen; and
(c) sequentially dispensing to the specimen and removing from the specimen four additional solutions, wherein the four additional solutions sequentially dispensed and removed are selected from the group consisting of wash solutions and transfer solutions, and wherein at least two of the four additional solutions are transfer solutions.

Additional Embodiment 15. The method of additional embodiment 14, wherein at least three of the four additional solutions are transfer solutions.

Additional Embodiment 16. The method of any of additional embodiments 14 to 15, wherein all four of the four additional solutions are transfer solutions.

Additional Embodiment 17. The method of any of additional embodiments 14 to 16, wherein the specimen comprises hematoxylin stain.

Additional Embodiment 18. A biological sample stained according to the method as in any of additional embodiments 14 to 17.

Additional Embodiment 19. A method for processing specimen within an automated histological staining system, the method comprising:
contacting the specimen with a staining reagent;
contacting the specimen with a wash solution to at least partially remove the staining reagent from the specimen;
contacting the specimen with a counterstaining reagent after contacting the specimen with the wash solution; and
contacting the specimen with an acid solution;
wherein the specimen is not contacted with an acid solution prior to the contacting of the specimen with the counterstain.

Additional Embodiment 20. A method for processing specimen within an automated histological staining system, the method comprising:
contacting the specimen with a staining reagent;
contacting the specimen with a wash solution to at least partially remove the staining reagent from the specimen;
contacting the specimen with a counterstaining reagent after contacting the specimen with the wash solution; and
iteratively contacting the specimen with transfer solution;
wherein the specimen is not contacted with the wash solution following the contacting of the specimen with the counterstain.

Additional Embodiment 21. An automated histological staining system, comprising:
a stainer;
a slide carrier within the stainer, wherein the slide carrier bears slides having a biological specimen disposed thereon; and
a dispenser within the stainer configured to deliver a plurality of fluids to the slides;
wherein the system is configured such that the biological specimens may be stained with a primary stain and a counterstain; and wherein the system is configured to dispense only wash solutions, transfer solutions, and/or alkaline solutions between staining with the primary stain and staining with the counterstain.

Additional Embodiment 22. The automated histological staining system of additional embodiment 21, wherein the system is configured to deliver an acid solution immediately after staining with the counterstain.

Additional Embodiment 23. The automated histological staining system of any of additional embodiments 21 to 22, wherein the system is configured to dispense only acid solutions, transfer solutions, and organic fluid solutions following staining with the counterstain.

Additional Embodiment 24. The automated histological staining system of additional embodiment 23, wherein the system sequentially dispenses to the specimen and removes from the specimen four aliquots of transfer solution following staining with the counterstain.

Additional Embodiment 25. A system comprising:
one or more processors; and
a non-transitory computer-readable memory storing instructions which, when executed by the one or more processors, cause an automated histological staining system to:
(a) dispense a predetermined amount of a hematoxylin solution to a specimen;
(b) at least partially remove the hematoxylin solution from the specimen;
(c) dispense a predetermined amount of an alkaline solution to the specimen;
(d) at least partially remove the alkaline solution from the specimen;
(e) dispense a predetermined amount of at least one additional solution to the specimen;
(f) at least partially remove the at least one additional solution from the specimen;

(g) dispense a predetermined amount of an eosin staining solution to the specimen;
(h) at least partially remove the eosin solution from the specimen; and
(i) dispense a predetermined amount of an acid solution to the specimen.

Additional Embodiment 26. The system of additional embodiment 25, wherein the system comprises instructions not to dispense any acid solution prior to eosin staining.

Additional Embodiment 27. The system of any of additional embodiments 25 to 26, wherein the system further comprises instructions to dispense an acid solution to the specimen after hematoxylin staining but prior to eosin staining.

Additional Embodiment 28. A system comprising:
one or more processors; and
a non-transitory computer-readable memory storing instructions which, when executed by the one or more processors, cause an automated histological staining system to:
(a) dispense a predetermined amount of an eosin staining solution to a specimen;
(b) at least partially remove the eosin solution from the specimen; and
(c) sequentially dispense to the specimen and remove from the specimen four additional solutions, wherein the four additional solutions sequentially dispensed and removed are selected from the group consisting of wash solutions and transfer solutions, and wherein at least two of the four additional solutions are transfer solutions.

Additional Embodiment 29. The system of additional embodiment 28, wherein at least three of the four additional solutions are transfer solutions.

Additional Embodiment 30. The system of any of additional embodiments 28 to 29, wherein all four of the four additional solutions are transfer solutions.

Additional Embodiment 31. The system of any of additional embodiments 28 to 30, wherein the specimen comprises hematoxylin stain.

Additional Embodiment 32. The system of any of additional embodiments 25 to 31, wherein the automated histological staining system is the automated histological staining system of any of additional embodiments 21 to 24.

Additional Embodiment 33. A non-transitory computer-readable storage medium encoded with instructions, which, when executed by a processing resource of a computing system, cause an automated histological staining system to:
(a) dispense a predetermined amount of a hematoxylin solution to a specimen;
(b) at least partially remove the hematoxylin solution from the specimen;
(c) dispense a predetermined amount of an alkaline solution to the specimen;
(d) at least partially remove the alkaline solution from the specimen;
(e) dispense a predetermined amount of at least one additional solution to the specimen;
(f) at least partially remove the at least one additional solution from the specimen;
(g) dispense a predetermined amount of an eosin staining solution to the specimen;
(h) at least partially remove the eosin solution from the specimen; and
(i) dispense a predetermined amount of an acid solution to the specimen.

Additional Embodiment 34. A non-transitory computer-readable storage medium encoded with instructions, which, when executed by a processing resource of a computing system, cause an automated histological staining system to:
(a) dispense a predetermined amount of an eosin staining solution to a specimen;
(b) at least partially remove the eosin solution from the specimen; and
(c) sequentially dispense to the specimen and remove from the specimen four additional solutions, wherein the four additional solutions sequentially dispensed and removed are selected from the group consisting of wash solutions and transfer solutions, and wherein at least two of the four additional solutions are transfer solutions.

Additional Embodiment 35. The non-transitory computer-readable storage medium of additional embodiment 33 or 34, wherein the automated histological staining system is the automated histological staining system of any of additional embodiments 21 to 24.

Additional Embodiment 36. A method of staining a specimen disposed on a substrate with an automated specimen processing apparatus, the method comprising:
(a) dispensing a predetermined amount of an eosin staining solution to a specimen;
(b) at least partially removing the eosin solution from the specimen; and
(c) sequentially dispensing to the specimen and removing from the specimen four additional solutions, wherein the four additional solutions sequentially dispensed and removed are selected from the group consisting of wash solutions and transfer solutions, and wherein at least two of the four additional solutions are transfer solutions.

Additional Embodiment 37. The method of additional embodiment 36, wherein at least three of the four additional solutions are transfer solutions.

Additional Embodiment 38. The method of any of additional embodiments 36 to 37, wherein all four of the four additional solutions are transfer solutions.

Additional Embodiment 39. The method of any of additional embodiments 36 to 38, wherein the specimen comprises hematoxylin stain.

Additional Embodiment 40. A method of staining a specimen comprising:
(a) contacting a predetermined amount of a hematoxylin solution to the specimen;
(b) at least partially removing the hematoxylin solution from the specimen;
(c) contacting a predetermined amount of an alkaline solution to the specimen;
(d) at least partially removing the alkaline solution from the specimen;
(e) contacting a predetermined amount of at least one additional solution to the specimen;
(f) at least partially removing the at least one additional solution from the specimen;
(g) contacting a predetermined amount of an eosin staining solution to the specimen;
(h) at least partially removing the eosin solution from the specimen; and
(i) contacting a predetermined amount of an acid solution to the specimen.

Additional Embodiment 41. The method of additional embodiment 40, wherein no acid solution is dispensed prior to eosin staining.

Additional Embodiment 42. The method of additional embodiment 41, wherein the method further comprises dispensing an acid solution to the specimen after hematoxylin staining but prior to eosin staining.

Additional Embodiment 43. The method of any of additional embodiments 40 to 42, wherein the specimen is stained using an automated specimen processing apparatus.

Additional Embodiment 44. The method of any of additional embodiments 40 to 43, wherein the specimen is stained using a dip-and-dunk technique.

Additional Embodiment 45. The method of any of additional embodiments 40 to 42 and 44, wherein the specimen is stained manually.

Additional Embodiment 46. An automated histological staining system, comprising:
  a stainer;
  a slide carrier within the stainer, wherein the slide carrier bears slides having a biological specimen disposed thereon; and
  a dispenser within the stainer configured to deliver a plurality of fluids to the slides;
  wherein the system is configured such that the biological specimens may be stained with a primary stain and a counterstain; and wherein the system is configured to dispense only wash solutions, transfer solutions, and/or alkaline solutions between staining with the primary stain and staining with the counterstain, and
  wherein the slide carrier is a tray holding the slides in a horizontal position.

Additional Embodiment 47. A method of staining a specimen disposed on a substrate with an automated specimen processing apparatus, the method consisting of:
  (a) dispensing a predetermined amount of an eosin staining solution to the specimen;
  (b) at least partially removing the eosin solution from the specimen;
  (c) dispensing a predetermined amount of an acid solution to the specimen;
  (d) at least partially removing the acid solution; and
  (e) dispensing an additional solution to the specimen.

Additional Embodiment 48. A method of staining a specimen consisting of:
  (a) applying a predetermined amount of an eosin staining solution to the specimen;
  (b) at least partially removing the eosin solution from the specimen;
  (c) applying a predetermined amount of an acid solution to the specimen;
  (d) at least partially removing the acid solution; and
  (e) applying an additional solution to the specimen.

Additional Embodiment 49. The method of additional embodiment 48, wherein at least one of the applying steps is performed manually.

Additional Embodiment 50. The method of additional embodiment 48, wherein each of the applying steps is performed manually.

Additional Embodiment 51. The method of any of additional embodiments 48 to 50, wherein at least one of the applying steps comprises dispensing to the specimen with an automated specimen processing apparatus, the specimen disposed on a substrate.

Additional Embodiment 52. A method of staining a specimen consisting of:
  (a) applying a predetermined amount of a primary staining solution to the specimen;
  (b) at least partially removing the staining solution from the specimen;
  (c) applying a predetermined amount of a counter staining solution to the specimen;
  (d) at least partially removing the counter staining solution from the specimen;
  (e) applying a predetermined amount of an acid solution to the specimen;
  (f) at least partially removing the acid solution from the specimen; and
  (g) applying an additional solution to the specimen; wherein no acid solution is applied between applying a primary staining solution to the specimen and the applying of the counter staining solution to the specimen.

Additional Embodiment 53. The method of additional embodiment 52, wherein the steps of applying are each performed manually.

Additional Embodiment 54. An automated method for processing a plurality of slides bearing biological tissue samples, comprising:
  performing a set of slide processing operations on the plurality of slides in one or more workstations while the slides in the plurality are held in spatially co-planar, substantially horizontal positions in a slide tray, wherein the set of slide processing operations includes staining samples on the slides in the spatially co-planar, substantially horizontal positions by flowing one or more stains from at least one reagent container, through a fluidics module, and out at least one dispense nozzle positioned above the slide tray, and solvent-exchanging;
  transporting the slide tray holding the plurality of slides to an automated coverslipper workstation after performing the set of slide processing operations that include at least staining and solvent-exchange;
  coverslipping the plurality of slides held in the slide tray with separate respective coverslips using the automated coverslipper workstation while the plurality of slides are held in spatially co-planar, substantially horizontal positions in the slide tray such that the coverslips on the slides are spaced apart from one another; and removing the slide tray holding the coverslipped slides from the automated coverslipper workstation;
  wherein the slide processing operations include dispensing a predetermined amount of a hematoxylin solution to the specimen; at least partially removing the hematoxylin solution from the specimen; dispensing a predetermined amount of an alkaline solution to the specimen; at least partially removing the alkaline solution from the specimen; dispensing a predetermined amount of at least one additional solution to the specimen; at least partially removing the at least one additional solution from the specimen; dispensing a predetermined amount of an eosin staining solution to the specimen; at least partially removing the eosin solution from the specimen; and dispensing a predetermined amount of an acid solution to the specimen.

Additional Embodiment 55. An apparatus for automatically treating biological specimens, comprising:
  at least one slide tray holding a plurality of slides in substantially horizontal positions, wherein said biological specimens are located on said slides;
  one or more workstations that receive said slide tray and perform one or more slide processing operations on said plurality of slides held in said slide tray;
  a transporter that moves said slide tray into and out of said one or more workstations;

a fluidics module in fluid communication with said one or more workstations that supplies a reagent to said one or more workstations;

a pneumatics module in fluid communication with said one or more workstations and said fluidics module;

wherein said pneumatics module supplies vacuum and/or pressurized gas to said one or more workstations and said fluidics module; and a control module in electrical communication with said transporter, said one or more workstations, said fluidics module and said pneumatics module, wherein said control module coordinates function of components of the apparatus during treatment of said biological specimens;

wherein the system is configured such that no acid solution is dispensed between application of a stain and application of a counterstain.

Additional Embodiment 56. The system of additional embodiment 55, wherein the system is adapted to dispense a predetermined amount of a hematoxylin solution to the specimen; at least partially remove the hematoxylin solution from the specimen; dispense a predetermined amount of an alkaline solution to the specimen; at least partially remove the alkaline solution from the specimen; dispense a predetermined amount of at least one additional solution to the specimen; at least partially remove the at least one additional solution from the specimen; dispense a predetermined amount of an eosin staining solution to the specimen; at least partially remove the eosin solution from the specimen; and dispense a predetermined amount of an acid solution to the specimen.

The invention claimed is:

1. A method of staining a specimen disposed on a substrate with an automated specimen processing apparatus, the method comprising:
   (a) dispensing a predetermined amount of a primary staining solution to the specimen;
   (b) at least partially removing the primary staining solution from the specimen;
   (c) dispensing a predetermined amount of an alkaline solution to the specimen;
   (d) at least partially removing the alkaline solution from the specimen;
   (e) dispensing a predetermined amount of at least one additional solution to the specimen;
   (f) at least partially removing the at least one additional solution from the specimen;
   (g) dispensing a predetermined amount of a counter staining solution to the specimen;
   (h) at least partially removing the counter staining solution from the specimen; and
   (i) dispensing a predetermined amount of an acid solution to the specimen.

2. The method of claim 1, wherein the at least one additional solution is selected from the group consisting of a wash solution, or a transfer solution.

3. The method of claim 1, wherein the at least one additional solution is an acid solution.

4. The method of claim 1, wherein the dispensing of the at least one additional solution to the specimen comprises (i) dispensing a wash solution; (ii) at least partially removing the wash solution; (iii) dispensing an acid solution; and (iv) at least partially removing the acid solution.

5. The method of claim 1, further comprising dispensing a wash solution after the at least partial removal of the primary staining solution from the specimen and prior to the dispensing of the alkaline solution.

6. The method of claim 1, further comprising (i) dispensing an acid solution after the at least partial removal of the primary staining solution from the specimen and prior to the dispensing of the alkaline solution; (ii) at least partially removing the acid solution from the specimen; and (iii) dispensing a wash solution to the specimen prior to dispensing the alkaline solution.

7. The method of claim 1, wherein the method is performed with an automated histological staining system.

8. The method of claim 1, wherein no acid solution is dispensed prior to dispensing the counter staining solution.

9. The method of claim 1, wherein the method further comprises dispensing an acid solution to the specimen after dispensing the primary staining solution but prior to dispensing the counter staining solution.

10. A method of staining a specimen consisting of:
   (a) applying a predetermined amount of a primary staining solution to the specimen;
   (b) at least partially removing the primary staining solution from the specimen;
   (c) applying a predetermined amount of a counter staining solution to the specimen;
   (d) at least partially removing the counter staining solution from the specimen;
   (e) applying a predetermined amount of an acid solution to the specimen;
   (f) at least partially removing the acid solution from the specimen; and
   (g) applying at least one additional solution to the specimen; wherein no acid solution is applied between applying a primary staining solution to the specimen and the applying of the counter staining solution to the specimen.

11. The method of claim 10, wherein the primary staining solution comprises hematoxylin.

12. The method of claim 10, wherein the counter staining solution comprises eosin.

13. The method of claim 10, wherein the at least one additional solution comprises a transfer solution.

14. The method of claim 10, wherein the method is performed with an automated histological staining system.

15. A non-transitory computer-readable storage medium encoded with instructions, which, when executed by a processing resource of a computing system, cause an automated histological staining system to:
   (a) dispense a predetermined amount of a counter staining solution to a specimen;
   (b) at least partially remove the counter staining solution from the specimen; and
   (c) sequentially dispense to the specimen and remove from the specimen four additional solutions, wherein the four additional solutions sequentially dispensed and removed are selected from the group consisting of wash solutions and transfer solutions, and wherein at least two of the four additional solutions are transfer solutions.

16. The non-transitory computer-readable storage medium of claim 15, wherein the counter staining solution comprises eosin.

17. The non-transitory computer-readable storage medium of claim 15, wherein at least three of the four additional solutions are transfer solutions.

18. The non-transitory computer-readable storage medium of claim 15, wherein all four of the four additional solutions are transfer solutions.

19. The non-transitory computer-readable storage medium of claim 15, wherein the specimen is previously stained with a primary stain.

20. The non-transitory computer-readable storage medium of claim 15, wherein the transfer solutions comprise one or more glycol ethers.

* * * * *